US009878927B2

(12) United States Patent
Servida

(10) Patent No.: US 9,878,927 B2
(45) Date of Patent: Jan. 30, 2018

(54) APPARATUS FOR PURIFYING A FLUID AND METHOD FOR PURIFYING A FLUID, IN PARTICULAR BY MEANS OF THE AFORESAID APPARATUS

(71) Applicant: IDROPAN DELL'ORTO DEPURATORI S.R.L, Milan (IT)

(72) Inventor: Tullio Servida, Milan (IT)

(73) Assignee: IDROPAN DELL'ORTO DEPURATORI S.R.L, Milan (IT)

(*) Notice: Subject to any disclaimer, the term of this patent is extended or adjusted under 35 U.S.C. 154(b) by 467 days.

(21) Appl. No.: 14/527,805

(22) Filed: Oct. 30, 2014

(65) Prior Publication Data
US 2015/0259224 A1 Sep. 17, 2015
US 2016/0326027 A9 Nov. 10, 2016

Related U.S. Application Data

(63) Continuation-in-part of application No. 14/215,094, filed on Mar. 17, 2014.

(30) Foreign Application Priority Data

Mar. 15, 2013 (IT) .............................. PD2013A0065
Sep. 15, 2014 (IT) .............................. PD2014A0234

(51) Int. Cl.
*C02F 1/469* (2006.01)
*B01D 61/42* (2006.01)
(Continued)

(52) U.S. Cl.
CPC .......... *C02F 1/4693* (2013.01); *B01D 61/422* (2013.01); *B01D 61/48* (2013.01);
(Continued)

(58) Field of Classification Search
CPC .................................................... C02F 1/4695
See application file for complete search history.

(56) References Cited

U.S. PATENT DOCUMENTS 5,026,465 A * 6/1991 Katz ...................... B01D 61/48
204/524
5,360,540 A 11/1994 Andelman
(Continued)

FOREIGN PATENT DOCUMENTS

EP    2 778 140         9/2014
GB      1013464 A  * 12/1965 ............. B01D 61/28
(Continued)

OTHER PUBLICATIONS

Konstantinos Delmentzis; Continuous electrodeionization through electrostatic shielding; Electrochimica Acta, Elsevier Science Publishers, Barking, GB, vol. 53, No. 6, Nov. 13, 2007 (Nov. 13, 2007), pp. 2953-2962, XP022411234,ISSN: 0013-4686, DOI: 10.1016/J.ELECTACTA.2007.11.006* p. 2953; figure 2* * p. 2954, left-hand column, last paragraph—p. 2956, left-hand column * *p. 2957, right-hand column, paragraph.

*Primary Examiner* — Keith D. Hendricks
*Assistant Examiner* — Salil Jain
(74) *Attorney, Agent, or Firm* — Mark M. Friedman

(57) ABSTRACT

Apparatus for purifying a fluid, which comprises at least one ion absorption cell (2) with an operating chamber (4, 5) at its interior through which a first operative fluid (F1) flows and an evacuation chamber (13, 13') through which a second operative fluid (F2, F2') flows and which is separated from the operating chamber (4,5) by a filtering membrane (100). A porous electrical conductor (18) is housed in the evacuation chamber (13, 13') and is traversed by the second operative fluid (F2, F2'). Two electrodes (A, B) have the aforesaid operating chamber (4, 5) and evacuation chamber (13, 13') interposed, and are supplied with opposite polari-
(Continued)

ties in order to generate an operative electric field in the operating chamber (4, 5) and a limited electric field in the evacuation chamber (13, 13'), the latter with value lower than the operative electric field, due to the shielding effect of the porous electrical conductor (18). The charged particles contained in the operating chamber (4, 5) are susceptible of traversing the filtering membrane (100) under the action of the operative electric field generated by the electrodes (A, B), and be evacuated by the second operative fluid (F2, F2') in the evacuation chamber (13, 13'), in which they are subjected to the action of the limited electric field.

16 Claims, 14 Drawing Sheets

(51) Int. Cl.
| | | |
|---|---|---|
| *B01D 61/44* | (2006.01) | |
| *B01D 61/46* | (2006.01) | |
| *B01D 61/48* | (2006.01) | |
| *C02F 103/08* | (2006.01) | |

(52) U.S. Cl.
CPC .......... *C02F 1/4695* (2013.01); *B01D 61/445* (2013.01); *C02F 2103/08* (2013.01); *C02F 2201/46* (2013.01); *C02F 2201/461* (2013.01)

(56) References Cited

U.S. PATENT DOCUMENTS

| | | | |
|---|---|---|---|
| 6,284,124 B1* | 9/2001 | DiMascio | B01D 61/48 204/533 |
| 6,413,409 B1 | 7/2002 | Otowa et al. | |
| 7,591,933 B2* | 9/2009 | Grebenyuk | B01D 61/46 204/260 |
| 2004/0178075 A1* | 9/2004 | Sato | B01D 61/48 204/632 |
| 2012/0031763 A1 | 2/2012 | Ohmi et al. | |
| 2012/0031834 A1* | 2/2012 | Higa | B01D 61/44 210/500.42 |
| 2014/0008227 A1* | 1/2014 | Andersen | B01D 61/44 204/518 |

FOREIGN PATENT DOCUMENTS

| | | |
|---|---|---|
| JP | 2003145164 | 5/2003 |
| WO | 00/44477 | 8/2000 |
| WO | 20050011849 | 8/2000 |
| WO | 20120170192 | 12/2012 |
| WO | 2014/121316 | 8/2014 |

* cited by examiner

APPARATUS FOR PURIFYING A FLUID AND METHOD FOR PURIFYING A FLUID, IN PARTICULAR BY MEANS OF THE AFORESAID APPARATUS

FIELD OF APPLICATION

The present invention regards an apparatus for purifying a fluid and a method for purifying a fluid, in particular by means of the aforesaid apparatus, according to the preamble of the respective independent claims.

More in detail, the apparatus and the method according to the invention are intended to be advantageously employed for removing ionized particles from a fluid, for the purpose of facilitating the recovery or removal of such particles. The latter can be typically constituted by ions of salts dissolved in a liquid or by metal ions, for example of industrial process fluids, or by polarizable organic substances.

The present apparatus can be intended for multiple applications, both in industrial and civil fields, such as the desalination of sea water, the softening of particularly hard waters, the removal of salts (such as chlorides and sulfates) from water, as well as the removal from any liquid of, for example, nitrates, nitrites, ammonia, heavy metals, organic substances (whether provided with an intrinsic electric charge or susceptible to polarization due to the electric field present that induces an electric dipole in the organic substance) or micropollutants in general, or for the deionization of fluids, for example of industrial processes or for the concentration of polluting substances that are difficult to dispose of or advantageous to recover for a reuse.

The apparatus, object of the present invention, can also be incorporated in a machine, in particular for domestic use. In this case, it will allow purifying the water intended for such machine, allowing the latter to better achieve the functionalities for which it is used; such functions for example may include producing drinks, cleaning dishes, clothes etc.

The present invention is therefore generally inserted in the industrial field of the production of apparatuses for removing ionized particles from fluids.

STATE OF THE ART

Apparatuses are known for purifying fluids that exploit the principle of capacitive deionization for removing ionized particles from a fluid. Such apparatuses comprise at least one cell composed of an assembly of flow-through capacitors; the cell is more in detail formed by a plurality of superimposed electrodes, between which a flow of fluid to be purified is made to pass. The electrodes face each other and are charged with opposite polarities by a direct current power supply unit.

Operatively, such known apparatus provides for the alternation of operating steps, in which the ions present in the fluid are captured on the opposite electrodes, and regeneration steps, in which the ions accumulated on the electrodes are removed by means of a washing fluid. The electrodes of the flow-through capacitors electrostatically absorb and release the ionic charge contaminants and actively participate in the process of deionization of the liquid to be treated.

The electrodes are also usually fed by collectors, for example made of graphite, and they are made of electrically conductive porous materials (e.g. typically made of carbon) in order to absorb high quantities of ionized particles on their surface.

Flow-through capacitors of the above-indicated known type are for example described in the patents U.S. Pat. Nos. 6,413,409 and 5,360,540.

The aforesaid operating and regeneration steps for the cells translate, with reference to the interaction between electrodes and ions, into the following operative steps:

a step for absorbing the ions on the porous surface of the carbon of the electrodes supplied with opposite voltages; the energy expended for such step is proportional to the quantity of ions that are captured;

a step of electrostatic liberation of the ions from the carbon of the electrodes, providing the latter with the previously absorbed quantity of charge, so as to neutralize the electrostatic attraction with the ions;

a step for moving away the ions that are no longer electrostatically bound, to outside the porous electrodes, by means of charging the ions with reversed polarity, with the consequent possibility to remove them from the cell by means of the passage of the washing liquid.

The apparatuses with flow-through capacitors, present on the market and which exploit the principle of capacitive deionization according to the cyclically repeated operative steps mentioned above, have proven in practice that they have numerous drawbacks.

A first drawback lies in the fact that the apparatuses with flow-through capacitors have intermittent and hence discontinuous operation, which strongly negatively affects their productive efficiency/output. Such drawback is intrinsic in the operating principle itself of such apparatuses that leads the cell to purify the fluid for a time that varies between 50 and 75% of its operation, which stems from the need to subject the electrodes to the different above-indicated steps in order to operate in different times and modes on the ions (absorbing them, neutralizing them, moving them away).

In addition, the alternation of the operating and regeneration steps leads to queues of diluted fluid that cannot be exploited and which contributes to further negatively affecting the performances of the cell.

A second drawback lies in the fact that within the cell, high salinity concentrations can be reached with the consequent precipitation of salts, and hence the formation of fouling. A widespread problem in the cells with flow-through capacitors indeed pertains to the need to prevent the solutes from precipitating between the electrodes of the capacitor, obstructing the fluid passage channels and thus rendering the cell useless in the long term.

It must also be considered that the capacity of the electrodes to capture the ions in solution, and more generally the charged particles, is a characteristic that positively affects the operation of the capacitor. Nevertheless, the ions, after having been captured by the electrodes in the operating step, must be easily releasable into the flow of the washing liquid of the regeneration step.

For such purpose, numerous different embodiments of electrodes have been developed aimed to attempt to optimize the physical and electrical relation between the surface of the same electrodes and the ions to be treated upon varying the abovementioned operative steps (absorption, liberation, moving away). For example, electrodes have been designed made of spongy active carbon, molded in the form of sheets or fibers, as described for example in the U.S. Pat. No. 6,413,409 or sheets of a mixture comprising PTFE as described for example in the U.S. Pat. No. 6,413,409.

However, it is clear that not all the obtained electrodes can have optimal efficiency, since it is always necessary to balance the opposing needs of first retaining, then releasing the ions, making compromises in the process.

Apparatuses for purifying fluids are known which exploit the principle of electrodialysis for removing ionized particles from a fluid. Through dialysis, it is possible to obtain the separation of positive and negative ions dissolved as solutes inside a solution, by the traversing of selectively-permeable membranes of anionic and cationic type.

In order to accelerate the dialysis phenomenon, rather slow, a direct potential difference is normally established by means of the application of electrodes with opposite sign, such that the ions are stimulated to migrate towards the electrode with charge opposite their own.

More in detail, the apparatuses for purifying a fluid by means of electrodialysis comprise a sequence of membranes alternately semi-permeable to cations and anions. Such membranes define parallel chambers; the aqueous solution to be purified is made to travel through these chambers. At the ends of the sequence of membranes, a potential difference is applied. Consequently, the ions migrate towards the electrode with opposite polarity, coming to form salt concentration chambers and salt dilution chambers. In other words, since the arrangement of the membranes is alternated with respect to their disposition to allow the ionic migration, the following come to be stabilized in the chambers: electrolyte trap compartments and purified solution (e.g. water) compartments.

The electrodialysis is thus based on the application of a direct electric field capable of forcing the ionic components to traverse the respective ion-selective and water-impermeable membranes.

A first drawback of the electrodialysis apparatuses lies in the fact that in order to prevent the staining of the semi-permeable membranes by the ions, it is necessary to use numerous expedients that can provide for filtering systems, the use of chemical agents, as well as temporary modifications in the operation of the electrodialysis apparatus, such as polarity reversal. All these expedients render the apparatus and its operation method complex and not very practical, such to require high, costly maintenance.

A second drawback of the electrodialysis apparatuses lies in the fact they are not adapted to treat fluids with low salinity, such to determine low conductivity in the fluid to be purified. Otherwise, it is known to arrange paints on electrodes that are capable of making positive or negative ions selectively pass.

Apparatuses for purifying fluids are known which exploit the principle of electrodeionization for removing ionized particles from a fluid. Such apparatuses described in the patents WO 00/44477, WO 2012/170192, JP 2003145164, WO 2005/011849, US 2012/031763 comprise at least one ion absorption cell traversed by a fluid to be treated containing ionized particles and provided with a containment structure that defines at least one first operating chamber through which the fluid to be treated flows and provided with a first wall having a first electrode associated provided with a first polarity, at least one second operating chamber through which the fluid to be treated containing ionized particles flows and provided with a second wall having a second electrode associated that is provided with a second polarity opposite the first, at least one first chamber for evacuating the ionized particles interposed between the first and the second operating chamber through which a washing fluid flows and provided with a third and a fourth wall opposite each other.

In addition, the third and the fourth wall delimit, alongside the first and the second wall, respectively the first and the second operating chamber. The third and the fourth wall each have at least one ion-selective area associated, susceptible to being traversed by ionized particles with corresponding polarity contained in the first and second operating chamber, which pass from the first and second operating chamber to the first evacuation chamber under the action of the electric field generated by the electrodes.

In accordance with the above-described prior apparatuses, the electric field always present in the first evacuation chamber between the third and the fourth wall acts on the ionized particles, pushing them to exit, in this manner reducing the efficiency of purification of the fluid to be treated.

With reference to the apparatus described in the patent US 2012/031763, it is specified that an intermediate electrode is provided at ground potential between two electrodes with opposite polarities. Such electrode does not decrease the electric field between the electrodes with opposite polarities and does not define any volume where the electric field maintains substantially constant potential value and where the fluid to be treated flows. Such apparatus has the same limits as the other apparatuses described above.

PRESENTATION OF THE INVENTION

In this situation, the problem underlying the present invention is therefore to eliminate the abovementioned problems of the prior art, by providing an apparatus for purifying a fluid and a method for purifying a fluid, in particular by means of the aforesaid apparatus, which are capable of removing high quantities of ionized particles with a high capture efficiency.

Another object of the present invention is to provide an apparatus and a method for purifying a fluid, which are capable of removing the ionized particles with high energy efficiency.

Another object of the present invention is to provide an apparatus and a method for purifying a fluid, which are capable of removing the ionized particles with high efficiency/output.

Another object of the present invention is to provide an apparatus and a method for purifying a fluid, which are capable of purifying fluids contaminated by salts of different ionic species.

Another object of the present invention is to provide an apparatus and a method for purifying a fluid, which require a low consumption of washing liquid.

Another object of the present invention is to provide an apparatus for purifying a fluid that is simple and inexpensive to obtain and entirely reliable in operation.

Another object of the present invention is to provide an apparatus for purifying a fluid, which allows being employed in a versatile manner in different applications, for industrial processes as well as in machines for home use, in plants in civil field for the purification of water and in plants for the desalination of sea water.

BRIEF DESCRIPTION OF THE DRAWINGS

The technical characteristics of the finding, according to the aforesaid objects, are clearly found in the contents of the below-indicated claims and the advantages thereof will be clearer from the following detailed description made with reference to the enclosed drawings, which represent several merely exemplifying and non-limiting embodiments of the invention, in which:

DETAILED DESCRIPTION OF A PREFERRED EMBODIMENT

With reference to the set of drawings, reference number 1 indicates overall an embodiment of an apparatus for purifying a fluid, object of the present invention.

The apparatus 1, according to the invention, is adapted to be employed for removing ionized particles present in fluids, such particles susceptible of being affected by the presence of an electric field, such as ions in solution.

Hereinbelow, the term ionized particles will generically indicate any contaminant dissolved in a fluid F1 to be treated, capable of being attracted by an electrostatic field, such as in particular the ions dissolved in a fluid.

The ionized particles will therefore not only comprise dissolved ions such as salts, chlorides, sulfates, nitrates, nitrites, ammonia and heavy metals, but also organic substances or micropollutant substances in general whether provided with an intrinsic electric charge or susceptible of polarization due to the electric field present (as indicated hereinbelow) which induces an electric dipole in the substance itself.

The apparatus 1 is therefore adapted to operate for the deionization of industrial process fluids and for the deionization of water, in particular for softening the water of the water supply system and for the desalination of sea water; it is particularly capable of removing, from its interior, salts in solution (such as chlorides and sulfates), nitrates, nitrites, ammonia, and other polarized contaminants of organic substances or micropollutants in general.

The apparatus 1 is also adapted to concentrate ionized particles within fluids, particularly of industrial processes, in order to facilitate the recovery or the disposal of such particles. In addition, the apparatus 1 is also adapted to be integrated in apparatuses or machines, for example for home use, in order to previously treat the water from the latter employed for their various use functions.

Figure 1:
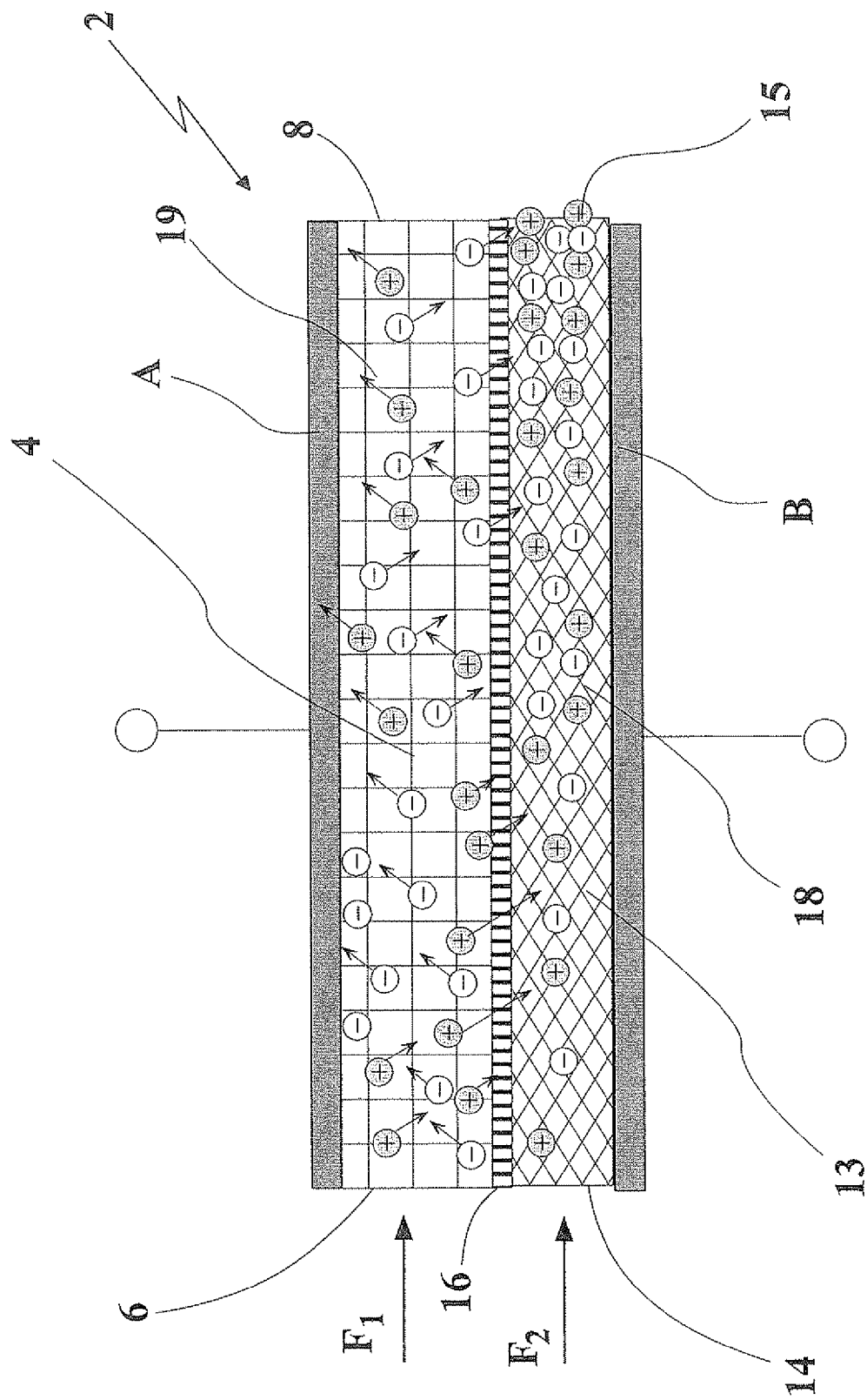
FIG. 1 schematically shows the apparatus for purifying a fluid object of the present invention in its minimum structural components.

In accordance with the present invention and with the scheme of the general FIG. 1, the apparatus 1 comprises at least one ion absorption cell 2, which is traversed by a first operative fluid F1 (for example a fluid to be treated) containing charged particles e.g. cationic and/or anionic particles, such as water with high degree of mineralization, i.e. mineral salts dissolved therein, and in particular with high hardness or with high quantities of calcium and magnesium salts contained therein. As indicated above, the first operative fluid F1 can also be a solution of organic type containing mineral salts to be removed or an organic solution where it is necessary to carry out a separation between the components of the solution itself on the basis of the electric charge and/or molecular weight.

The apparatus can provide for multiple cells in series or parallel in a per se known manner in order to improve the purification of the fluid or treat high flow rates.

The aforesaid cell 1, illustrated in partial schematic form in the enclosed figures, is provided with a containment structure 3, e.g. made of plastic material, which at its interior contains at least one operating chamber 4 and at least one chamber 13 for evacuating the charged particles.

The operating chamber 4 is provided with an inlet opening 6 and an outlet opening 8, through which the aforesaid first operative fluid F1 is susceptible to flow while the evacuation chamber 13 is provided with an inlet section 14 and an outlet section 15, through which at least one second operative fluid F2 flows (e.g. a washing fluid).

As specified hereinbelow, multiple operating chambers 4 and multiple evacuation chambers 13 can also be provided for each cell 1, or a plurality of elementary cells can be provided, each provided with one or more operating chambers and one or more evacuation chambers 13, as specified hereinbelow in the various illustrated examples.

According to the idea underlying the present invention, the operating chamber 4 and the evacuation chamber 13 are separated from each other by a filtering membrane 100.

The filtering membrane can therefore advantageously be with reverse osmosis, nanofiltration, ultrafiltration, microfiltration or even, in accordance with the example of FIG. 13-16, an ion-selective membrane.

The filtering membrane will therefore be susceptible of separating components of fluids on the basis of size or weight characteristics in the case of reverse osmosis, nanofiltration, ultrafiltration or microfiltration membranes and on the basis of electrical characteristics in the case of filtering membrane with ion exchange (ion-selective membrane).

The aforesaid filtering membranes, which separate the fluid components on the basis of size or weight characteristics, are usually classified based on their MWCO "molecular weight cut off" acronym, rather than on the size of the particles that they are capable of filtering.

The measurement unit MWCO of the filtering membranes is the Dalton that expresses the mass of the single atoms, molecules, ions, radicals and elementary particles. If MWCO is >10,000 Dalton, this is ultrafiltration; if MWCO is <500 Dalton this is reverse osmosis (RO). The size of the "pores" of a membrane describes the characteristics of the membrane and the size of the particles that can be repelled. In the microfiltration membranes, the size of the pores various from 10 to 0.1 mm. This is the membrane with the largest pores and is suitable for allowing the passage of a flow even in the presence of low pressures. In the ultrafiltration membranes, the size of the pores varies from 0.1 to 0.01 mm. In the nanofiltration membranes the size of the pores varies from 0.01 to 0.001 mm. In the reverse osmosis membranes the size of the pores varies from 0.001 to 0.0001 mm.

The filtering membrane will advantageously form, in a complete manner without requiring another support layer, the separation wall between the operating chamber 4 and the evacuation chamber 13.

Inside the evacuation chamber 13, a porous electrical conductor 18 is housed, which is traversed by the second operative fluid F2 parallel along the plane of extension of the same porous electrical conductor. The latter also simultaneously forms a spacer for the walls of the evacuation chamber 13, as will be specified hereinbelow.

The apparatus 1 further comprises a first and a second electrode A, B separated from each other with at least one aforesaid operating chamber 4 and at least one aforesaid evacuation chamber 13 interposed.

The two electrodes A, B are power supplied by an electrical power supply source 12 with opposite polarities in order to generate, respectively, an operative electric field in the operating chamber 4 and a limited electric field in the evacuation chamber 13.

The electric field in the evacuation chamber 13 has lower value than the operative electric field in the operating chamber 4, due to the shielding effect exerted by the porous electrical conductor 18.

Consequently, the charged particles contained in the operating chamber 4 are susceptible of traversing the filtering membrane 100 under the action of the operative electric field generated by the electrodes A, B, and then be evacuated by the second operative fluid F2 once they have reached the evacuation chamber 13.

Indeed, the charged particles, once they have reached the evacuation chamber 13, remain substantially confined at its interior, since herein they are subjected to the small action of the limited electric field due to the presence of the porous electrical conductor, while they are subjected to the evacuation action by the second operative fluid F2.

The power supply source 12 will be adapted to supply the aforesaid electrodes with the aforesaid negative and positive voltages, with direct power supply or with pulsed power supply having average voltage value respectively positive and negative.

The electrical power supply source 12 will be susceptible of periodically reversing the polarities of the two electrodes A, B in order to force said cationic particles and the anionic particles contained in the operating chamber 4 to enter into a same evacuation chamber 13 by traversing the filtering membrane 100.

Advantageously, the pressure in the first evacuation chamber 13 is therefore regulated with respect to the pressure in the contiguous operating chambers 4, 5 to a value susceptible of limiting the leakage of flows F1 or F2 through the filtering membrane 100, preferably between 0 and 20%.

Preferably, in the operating chamber 4, an isolating porous spacer separator 19 is housed that is susceptible of being traversed by the first operative fluid F1. It is obtained, for example, by means of a granular material or by means of a net, which have definite size equal to the distance between the walls of the operating chamber 4.

The apparatus 1 according to the invention can comprise a plurality of operating chambers 4 and a plurality of evacuation chambers 13, distributed in succession with each other according for example to one of the configurations illustrated hereinbelow, with a plurality of pairs of first and second electrodes A, B electrically connected in series and with each pair at least one respective operating chamber 4 and one evacuation chamber 13 being interposed.

Between the first wall 10 of the first operating chamber 4 and the third wall 16 of the first evacuation chamber 13, a first isolating porous spacer separator 19 is preferably interposed, susceptible of being traversed in its extension by the first operative fluid, F1.

In accordance with an advantageous characteristic of the invention, the apparatus 1 comprises at least one ion exchange resin 36 contained inside the operating chamber 4 in order to interfere with the passage of the first operative fluid F1, and maintained herein by means of retention means 37.

In operation, the apparatus described up to now mainly from the structural standpoint operates as specified hereinbelow.

The positively and/or negatively charged particles contained in the first operative fluid F1 which flow in a continuous manner into the operating chamber 4 are forced by the action of the electric field produced by the two electrodes A, B to migrate respectively towards the cathode (negative electrode) and towards the anode (positive electrode). In such migration, the positive cationic particles and negative anionic particles contained in the fluid of the operating chamber 4 encounter the filtering membrane 100 and are forced by the electric field to traverse it, passing through the meshes of the material constituting the membrane until they enter into the evacuation chamber 13. The charged particles with different polarity can traverse a same membrane 100 following the polarity reversal of the electrodes, or two separate membranes 100 in order to enter into two separate evacuation chambers if the evacuation chamber 13 is placed next to two operating chambers 4, or if two successive operating chambers 4 are provided which traverse electric fields with different polarity according to the descriptive examples illustrated hereinbelow.

Once they have entered the evacuation chamber 13, the charged particles are subjected herein to a small action of the electric field and hence they are no longer able to cross the filtering membrane 100, remaining confined in the substantially equipotential volume of the evacuation chamber 13, in order to then be conveyed towards the drain by the flow of the second operative fluid F2 which advances in the evacuation chamber 13.

Through the operative electric field present in the operating chamber 4, the charged particles present therein are moved into a volume constituted by the evacuation chamber 13, with limited electric field lower than that of the operative electric field, passing through a check barrier constituted by the filtering membrane 100 which (at least partly) separates the operating chamber 4 from the evacuation chamber 13.

The porous electrical layer 18, for example constituted in accordance with a possible abovementioned embodiment by a metallic net possibly assisted by a porous and conductive filler, causes the isopotentiality of the third chamber 13, like a Faraday cage, with shielding of the electric field in order to prevent conducting the charged particles to outside the same chamber 13 once they have entered inside.

In accordance with the embodiment illustrated in the enclosed FIGS. 3A, 3B, 7, 8, 9 and 10, at least one first and one second operating chamber are provided, respectively indicated with the reference numbers 4 and 5, respectively provided with a first and a second inlet opening, 6, 7 and with a first and second outlet opening 8, 9, through which the first operative fluid F1 is susceptible of flowing.

The aforesaid first and second operating chamber 4, 5 are respectively provided with a first and second wall 10, 11 for containing the first operative fluid, with which the first and second electrode A, B are correspondingly associated; such electrodes are power supplied by the electrical power supply source 12 to a first and a second polarity that are opposite each other. Advantageously, in accordance with a preferred but non-limiting embodiment of the present invention, the first and the second containment wall 10, 11 themselves achieve the two electrodes, given that they are constituted by a conductor material, such as graphite. The electrodes can be of the type with high surface area, of the type widely described in the literature for capacitive deionization. These electrodes with high porosity and surface area in fact allow an improved creation of the electric field, especially in the case of power supply with alternating polarity of the cell as described hereinbelow.

For such reason, the electrodes A, B coincide in the figures in accordance with this example with the same two containment walls 10, 11.

For some specific requirements, such as for example improving the ease of cleaning and/or sterilizing the cell, in some embodiments it may be advantageous to add, in front of the electrodes, a porous separation membrane similar to that indicated above and further considered hereinbelow.

According to the present invention in accordance with this embodiment, the first evacuation chamber 13 of the cationic particles and/or anionic particles absorbed from the two operating chambers 4, 5 is interposed between the first operating chamber 4 and the second operating chamber 5, and is provided with a third inlet opening 14 and a third outlet opening 15, through which the second operative fluid F2 flows.

The third chamber 13 is delimited by a third and fourth wall 16, 17, parallel to and opposite each other, which separately delimit, together with the first wall 10 and the second wall 11, respectively the first operating chamber 4 and the second operating chamber 5.

The third and the fourth wall 16, 17 each comprise the filtering membrane 100, which as said can be with reverse osmosis, nanofiltration, ultrafiltration or microfiltration.

The electric field in the first evacuation chamber 13 is present in a much more limited manner due to the presence of the porous electrical conductor 18 inside the same first evacuation chamber 13. Such porous electrical conductor 18 is provided, in accordance with this embodiments and advantageously in accordance with all the embodiments of the present invention, with a thickness and hence with a corresponding volume susceptible of being traversed at its interior by the washing fluid F2, along the thickness of the conductor. This porous electrical conductor 18 is interposed between the third and the fourth wall 16, 17 and is in close contact with the same third and fourth wall 16, 17, thus reducing, inside the first evacuation chamber 13, the electric field generated by the first and second electrode 10, 11. Such porous electrical conductor causes a shielding effect of the electric field due to the volume subtended between the third and the fourth wall 16, 17 such that the charged particles contained in the first evacuation chamber 13 do not have the force to pass through the membranes.

The porous electrical conductor 18 extends its shielding substantially up to the internal surface of the third and fourth separation wall 16, 17, with the first operative fluid F1, that flows into the two operating chambers 4, 5 and which obviously has higher resistivity.

The aforesaid porous electrical conductor 18 is advantageously formed by at least one three-dimensional porous structure (provided with thickness), in particular interposed as a spacer between the third and fourth wall 16, 17, and made of conductive material such as a metal, porous active carbon, possibly expanded graphite, carbon aerogel or other materials with similar characteristics. The three-dimensional structure of the material will allow the passage of the fluid at its interior (in the same lying plane thereof) and will thus attain the electrostatic shielding. The aforesaid porous electrical conductor 18 can also be advantageously formed by a net made of conductive material, e.g. made of metal, it too interposed as a spacer between the third and fourth wall 16, 17 and provided with a three-dimensional structure in order to allow the passage of the fluid in its same lying plane.

Therefore, the above-described configuration of the cell 2 provides for making the second operative fluid F2 flow into the first evacuation chamber 13 interposed adjacent between the two operating chambers 4, 5 where the first fluid F1 (e.g. the fluid F1 being the fluid to be treated and the fluid F2 the washing fluid) moves; the first evacuation chamber 13 is separated from the two operating chambers 4, 5 by means of the filtering membranes of the third and fourth wall 16, 17 which are substantially not permeated by a flow of fluid F1 or F2 but which allow the selective crossing, under the action of the electric field generated by the electrodes A, B, of the ionized particles contained in the first operative fluid F1.

The filtering membranes that constitute the walls 16, 17 would allow a significant flow of liquid to cross them only in the presence of a pressure difference at their sides; at the same time, due to their porosity, they do not constitute an insulator capable of interrupting the electric field and the ion conduction.

The pressure in the first evacuation chamber 13 is therefore regulated with respect to the pressure in the contiguous operating chambers 4, 5 to a value susceptible of limiting the leakage of flows F1 or F2 preferably between 0 and 20%.

Therefore, as indicated above, preferably the pressure in the first evacuation chamber 13 will be regulated with value lower than that of the two operating chambers 4, 5 so as to prevent or limit a leakage of fluid F2 from such first evacuation chamber 13 to the two operating chambers 4, 5. Advantageously, in fact, the leakage if provided will be directed from the operating chambers 4,5 to the evacuation chamber 13.

Preferably, the filtering membrane 100 will not exert a filtering action on a flow of fluid moving through the membrane due to a difference of pressures between the operating chambers 4, 5 and the evacuation chamber 13, since such flow will not be advantageously present; rather, it will only exert a filtering action on a flow of charged particles which are moved by the electric field.

The filtering membrane 100 will also allow selecting the ionic particles that move into the evacuation chamber 13 as a function of its filtering characteristics (e.g. as a function of the size of the charged particles). Multiple evacuation chambers 13 can be provided in succession in different apparatuses 1 or in the same apparatus and delimited by filtering membranes 100 of different type in order to selectively separate ionic species of particles with different size or weight, or in any case particles that can be differently filtered by means of the different membrane types.

It will also be possible to insert, inside the same cell, more than one evacuation chamber 13 for the purpose for example of being able to advantageously obtain permeate fluids through the filtering membranes 100, with particles with opposite polarity.

Even if preferably the filtering membrane 100 is not per se, due to its nature and material, impermeable to the fluid F1 or F2, it will in operation—due to the regulation of the pressure in the operating chambers 4, 5 and in the evacuation chamber 13—substantially behave in an impermeable manner with respect to a fluid flow but in a permeable manner to the ionized particles capable of traversing the membrane.

The filtering membranes 100 that delimit the evacuation chamber 13, in accordance with the abovementioned embodiment illustrated in the enclosed FIGS. 3A, 3B, 7, 8, 9 and 10, are therefore susceptible of being traversed by charged particles contained in the first and second operating chamber 4 and 5, which are acted upon by the action of the operative electric field generated by the electrodes A, B. At the same time, the filtering membranes 100 are adapted to confine, within the same first evacuation chamber 13, the cationic particles or the anionic particles or particles of both polarities, which crossed the filtering membrane 100, maintaining them inside the same first evacuation chamber 13 due to the small movement force induced thereon by the electric field in such first evacuation chamber 13.

The filtering membranes 100 can face the electrodes for the entire extension thereof or they can be composed of side-by-side portions of membranes with different filtration characteristics in order to select ionized particles that can be differently filtered.

Figure 8:
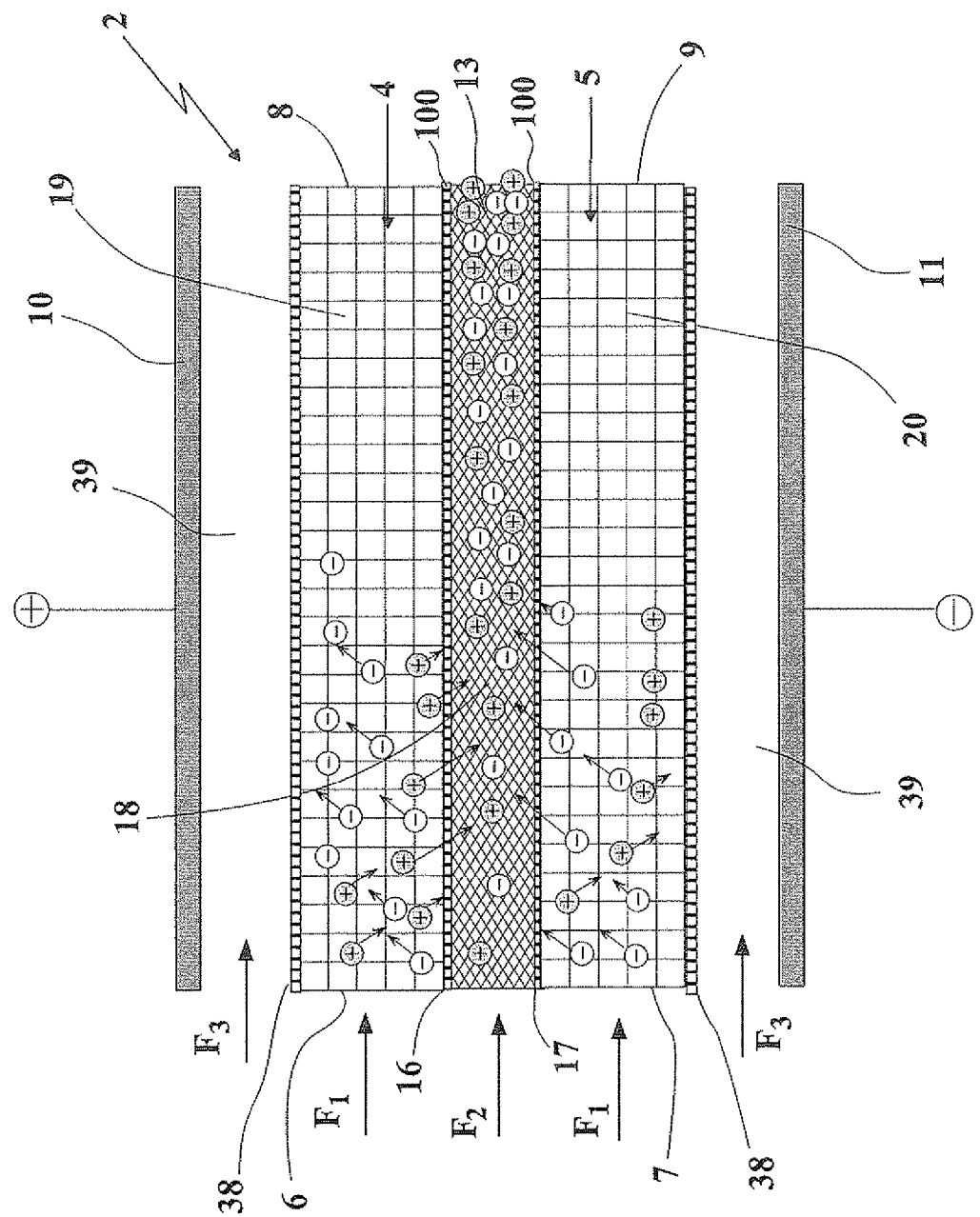

Advantageously, the aforesaid electrodes A, B (with reference to the specific example as illustrated in FIG. 8, with reference to a subsequent example illustrated in FIG. 5 and also with reference to the general principle of the present invention) can be protected by a cover layer 38, such as an analogous filtering membrane with reverse osmosis, nanofiltration, ultrafiltration or microfiltration, for the purpose of protecting from dirtying due to the attraction of the ionized particles towards the electrodes A, B themselves. The porosity of the filtering membranes 100 is capable of preventing the electrical isolation of the electrodes A, B from the fluid.

Such cover layer 38 of the electrodes, if advantageously provided, can be made both in contact with the face of each electrode A, B, and spaced therefrom in order to define with each electrode a further secondary chamber 39 for the passage of a secondary fluid F3, as is schematized in FIG. 8 (and in FIG. 5 with reference to a further example described hereinbelow).

The secondary fluid F3 can also have the purpose of improving the conduction of the electrodes A, B with respect to the first operative fluid F1 and simultaneously maintaining clean the surfaces of the electrodes A, B themselves.

Between the first wall 10 of the first operating chamber 4 and the third wall 16 of the first evacuation chamber 13, a first isolating porous spacer separator 19 is preferably interposed, susceptible of being traversed in its extension by the first operative fluid F1.

Analogously, between the second wall 11 of the second operating chamber and the fourth wall 17 of the first evacuation chamber 13, a second isolating porous spacer separator 20 is preferably interposed, also susceptible of being traversed by the fluid F1 to be treated.

The abovementioned cell 2 is advantageously obtained by means of a plurality of superimposed purification layers, affected upstream and downstream by a common hydraulic circuit.

For example, in accordance with the aforesaid embodiment illustrated in the enclosed FIGS. 3A, 3B, 7, 8, 9 and 10, each purification layer comprises a first 4, a second 5 and a third chamber 13 in addition to the electrodes.

More in detail, in such embodiment, the cell 2 is for such purpose provided with:
- a first supply section 21 obtained in its containment structure 3, and adapted to supply, with the first operative fluid F1, the first inlet opening 6 and the second inlet opening 7 respectively of the first and the second operating chamber 4, 5 of all the purification layers;
- a first extraction section 22 obtained in its containment structure 3, and adapted to receive the treated fluid F1 from the first outlet opening 8 and from the second outlet opening 9 of the first and of the second operating chamber 4, 5 of the aforesaid purification layers;
- a second supply section 23 obtained in the containment structure 3, which supplies, with the second operative fluid F2, the third inlet opening 14 of the first evacuation chamber 13 of the aforesaid purification layers;
- a second extraction section 24 obtained in the containment structure 3, which receives the washing fluid from the third outlet opening 15 of the first evacuation chamber 13 of the aforesaid purification layers.

The electrical connection between the first and the second electrodes A, B of each purification layer is made by means of terminals (not shown) which are connected to respective projections 25 externally projecting from the electrodes A, B themselves; preferably the projections 25 of the positive and negative electrodes A, B are extended from opposite sides or in any case sides of the respective electrodes A, B that are spaced from each other. The two supply liquids of the cell, i.e. the first operative fluid F1 and the second operative fluid F2, can also be constituted by the same liquid (for example water to be treated and washing water), also by arranging a common supply.

The apparatus further comprises:
- a first solenoid valve or manual interception and/or regulation valve 28 in the supply duct 29 to the first inlet section 21;
- a second solenoid valve 30, or in its place a first manual adjustment tap, placed on the delivery duct 31 to the users and connected to the first extraction section 22;
- a third solenoid valve 32 on the supply duct 33 of the second operative fluid F2 connected to the second inlet section 23;
- a fourth solenoid valve 34 on the drain duct 35, connected to the second extraction section 24, or preferably in its place a second tap for adjustably varying the ratio between the first operative fluid F1 and the second operative fluid F2.

Figure 9:
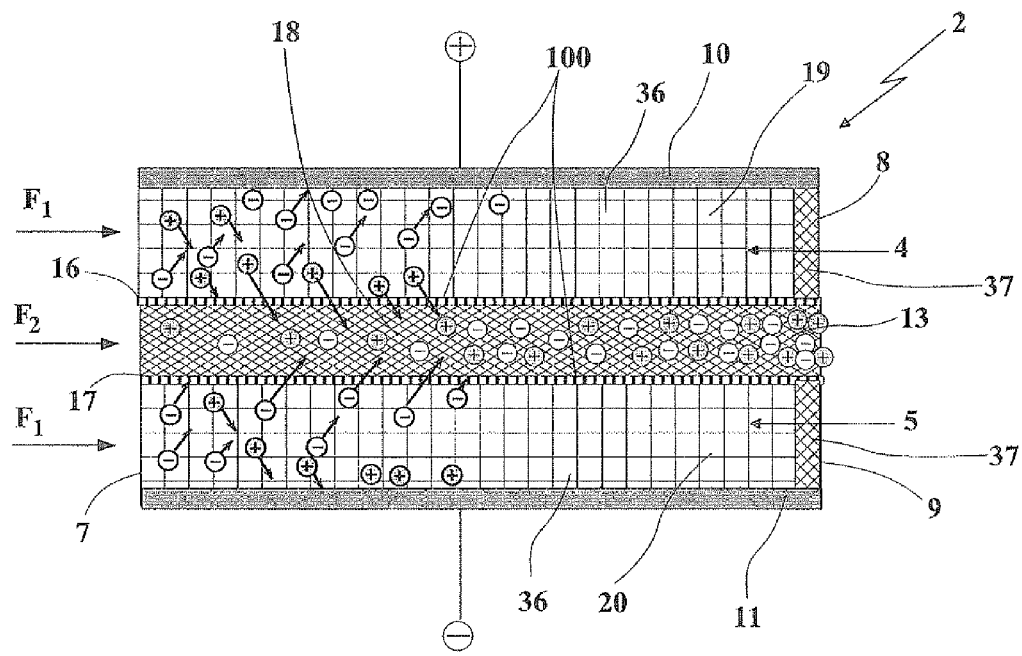
Figure 10:
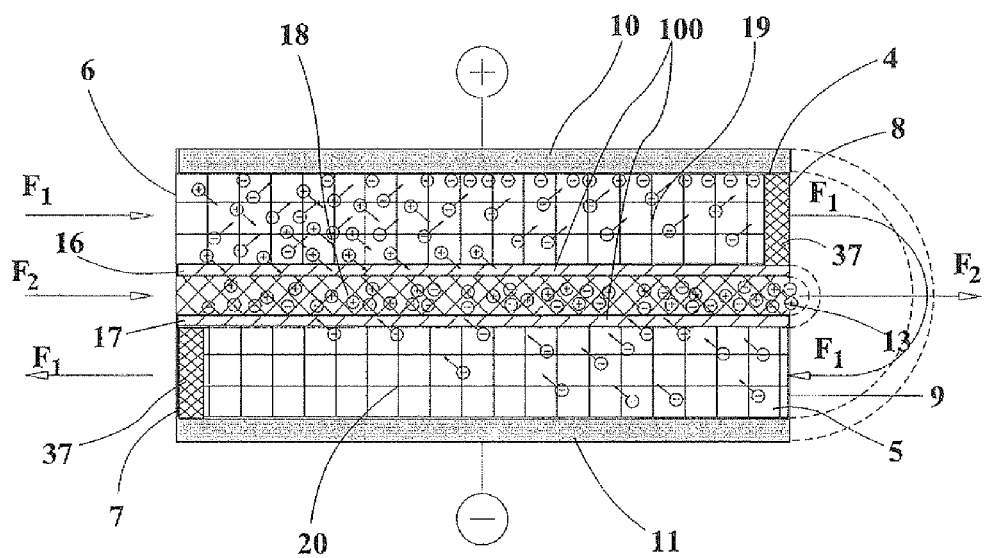

In accordance with a particular characteristic of the present invention illustrated in FIGS. 9 and 10 in accordance with the first embodiment of the invention but also applicable to the other embodiments and to the general principle of the invention, ion exchange resins 36 are provided, contained inside at least one of the two operating chambers 4 and 5 in order to interfere with the passage of the first operative fluid F1. The resins are maintained inside the operating chamber without being evacuated from the first operative fluid F1 by means of retention means 37.

Preferably, such ion exchange resins are of anionic and cationic type mixed together, both resin types preferably inserted in both the operating chambers 4, 5.

Preferably, the aforesaid retention means 37 are obtained with a porous separator, e.g. fixed to the operating chambers 4, 5 at the outlet opening 8, 9 thereof, susceptible of allowing the continuous passage of the first operative fluid F1 and simultaneously of retaining the resins 36, preventing the exit thereof together with the first operative fluid F1.

In operation, the resins allow slowing the advance of the cationic and anionic ions to the interior of the chambers together with the first operative fluid F1, increasing the possibility that they will be electrostatically attracted towards the evacuation chamber 13. More in detail the anionic and cationic resins 36 will be more greatly worn in proximity to the inlet openings 6, 7 of the operating chambers 4, 5, being able to retain a limited number of ions, while they will be more active towards the outlet openings 8, 9 where the ions are less numerous and where, therefore, due to their ion retention contribution, they allow the ions to have a greater possibility to cross the ion-selective areas and enter into the evacuation chamber 13.

In accordance with a preferred embodiment of the present invention, the electrical power supply source 12 is advantageously susceptible of periodically reversing the polarities of the first and second electrode 10, 11 in order to force the cationic particles and the anionic particles contained in the first and second operating chamber 4, 5 to enter into the third chamber 13 by traversing the corresponding filtering membrane.

Preferably, in accordance with the aforesaid embodiment, i.e. also with the others illustrated in the present description, the polarity reversal frequency varies in an interval comprised between 0.5 Hz and 100 Hz.

In accordance with this polarity reversal, the two operating chambers 4, 5 are traversed in parallel by the first operative fluid 1 since the anionic and cationic particles, due to the polarity reversal, can cross through the filtering membranes that delimit the first evacuation chamber 13, in order to then be removed from the second operative fluid F2 (hence with washing function) coming from either the first or the second operating chamber 4, 5.

Figure 2:
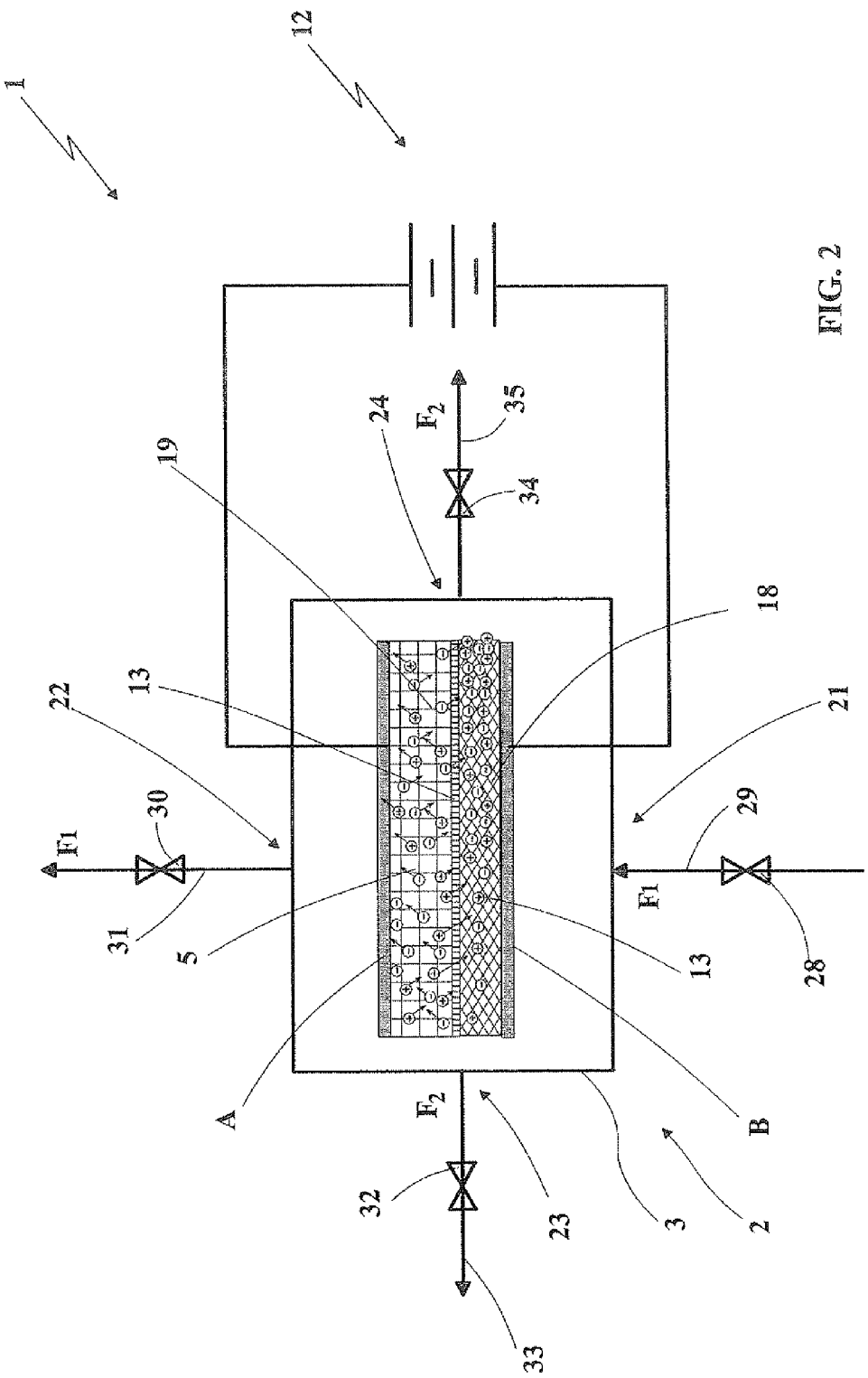
FIG. 2 shows a general electrical and hydraulic operation scheme of the apparatus for purifying a fluid, object of the present invention.
Figure 11:
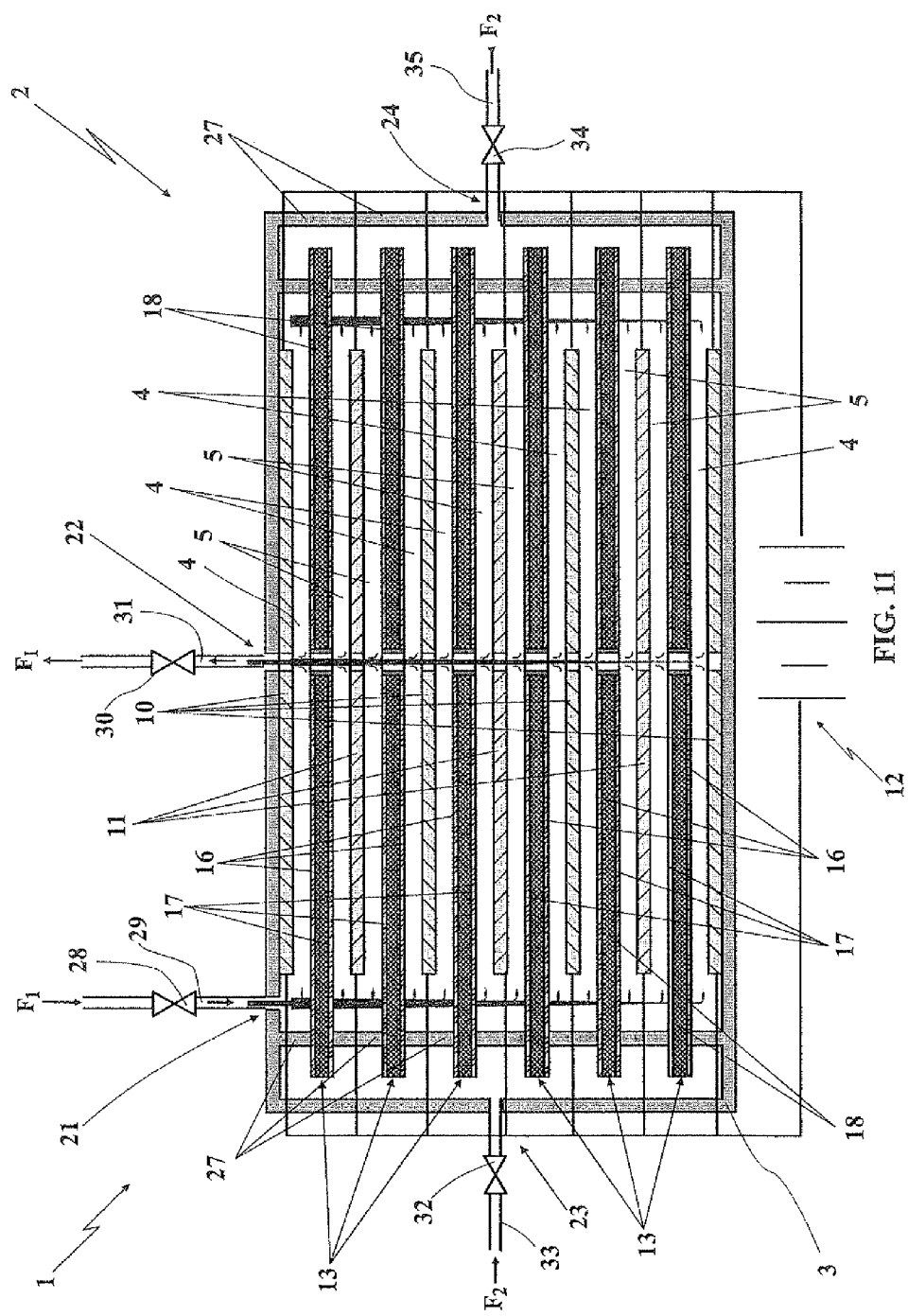
FIG. 11 schematically shows, in cross section view, the apparatus for purifying a fluid in accordance with the embodiment of FIGS. 3A and 3B in which the elementary layers or cells are repeated in succession.
Figure 12:
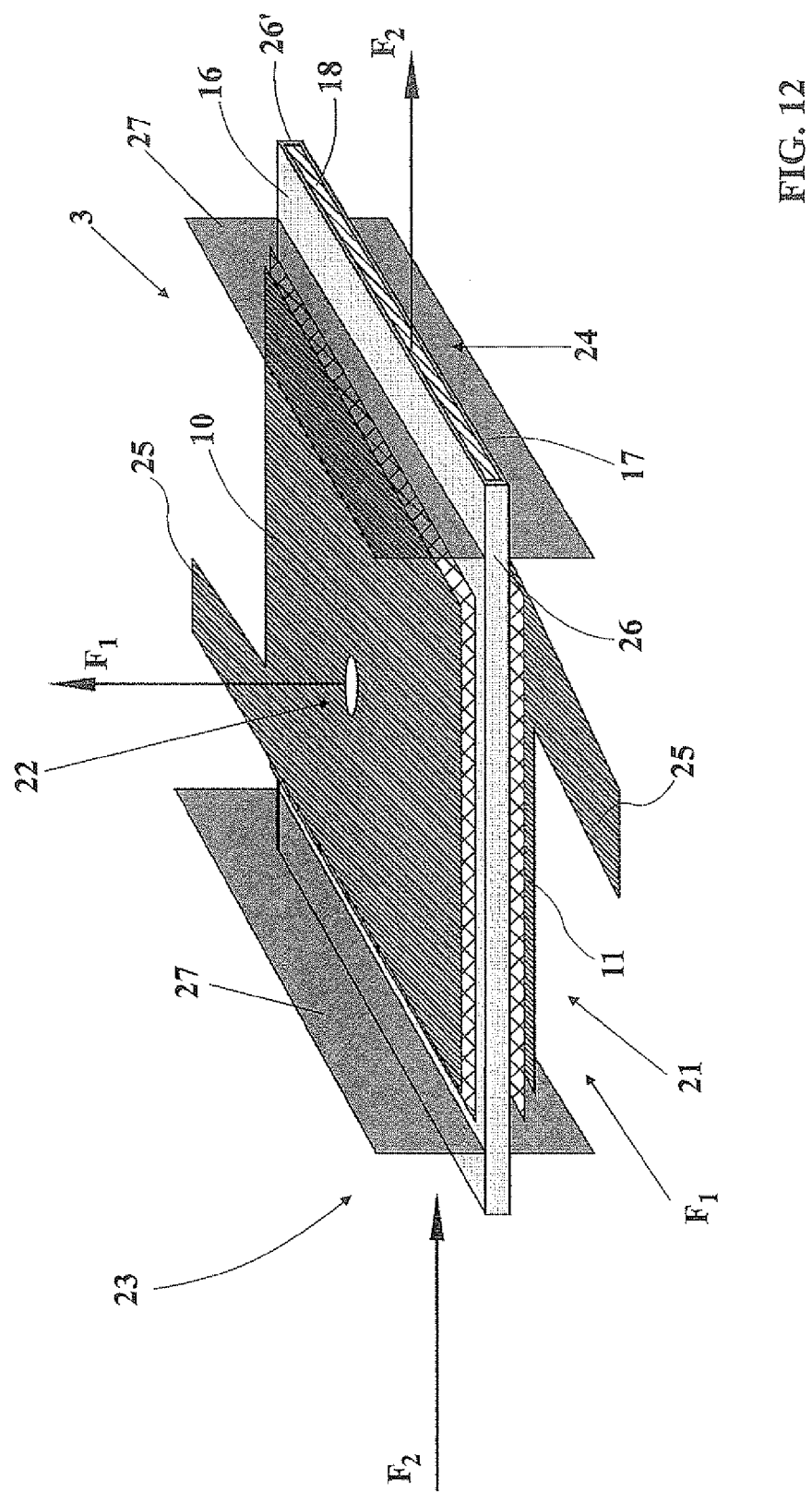
FIG. 12 schematically shows, in a perspective view, a portion of the cell of the apparatus for purifying a fluid of FIG. 11.
Figure 13:
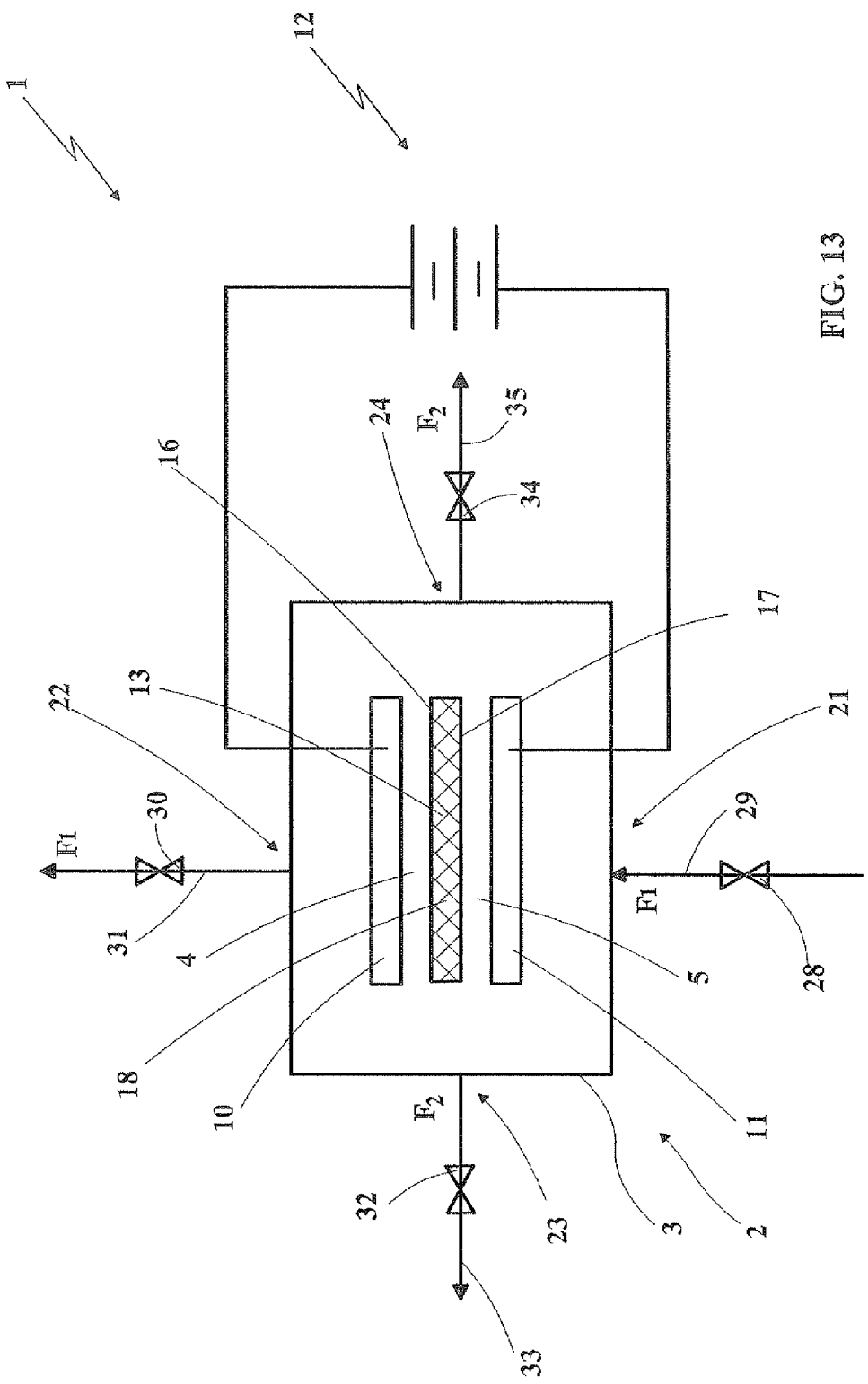
FIG. 13 shows a general electrical and hydraulic operation scheme of a variant embodiment of the apparatus for purifying a fluid, according to the present invention.

Of course, the single purification layer of the cell 2, shown in FIG. 12 in perspective view, can be repeated n times as illustrated in FIG. 2 in order to obtain a greater filtering action. In this case, preferably, as illustrated in the same FIG. 11, each intermediate electrode 10, 11 (excluding only the final electrodes) will act as a containment wall for two first operating chambers 4 or for two second operating chambers 5 of two adjacent and consecutive purification layers.

Preferably, moreover, the second extraction section 24 is extended substantially transversely to the purification layers, preferably in a central zone of the chambers 4, 5, 13, traversing the first 10, the second 11, the third 16 and the fourth wall 17 with corresponding through holes. In addition, in accordance with the embodiment characteristic illustrated in the detail of FIG. 7, but in general also referable as a variant of the present invention, the first evacuation chamber 13 is obtained in duct form and for such purpose is laterally closed with two lateral walls 26, 26' placed to join the third and fourth wall 16, 17 at two opposite edges thereof so as to create a duct for conveying the evacuation fluid. The latter is preferably extended with its ends beyond provided spacer separators 27, which delimit the extension of the first and second walls 4, 5 and separate the liquid to be treated F1, with which the first and the second chamber 4, 5 are supplied, from the washing liquid F2.

Figure 7:
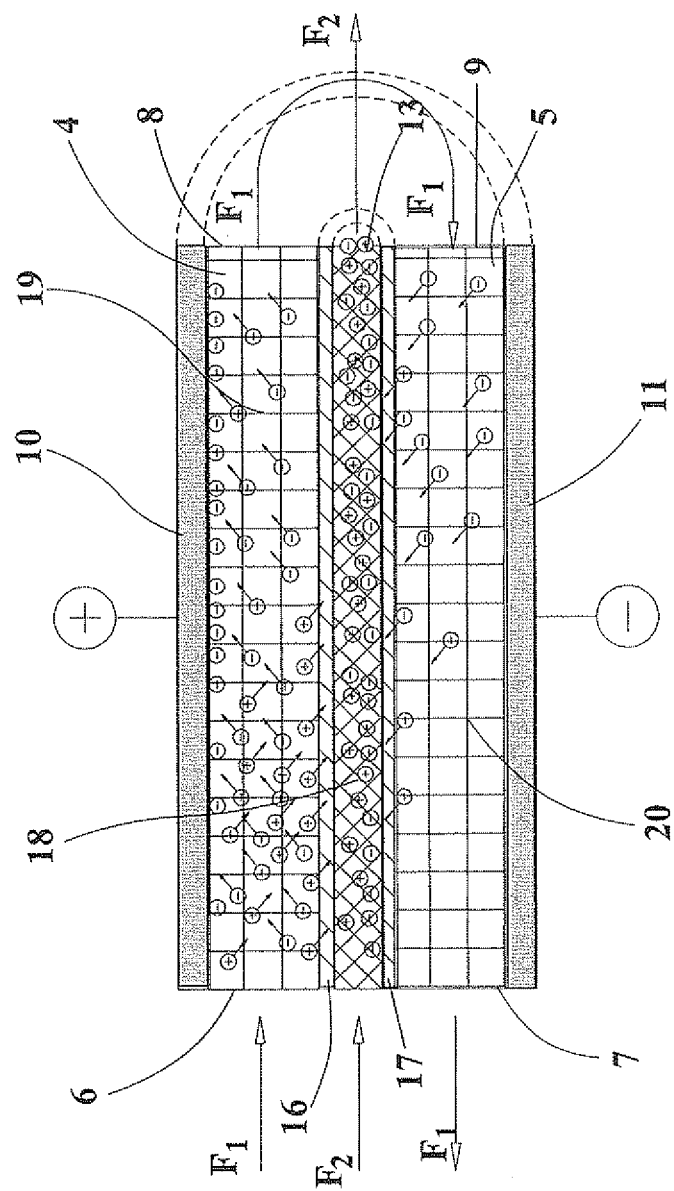
FIGS. 7, 8, 9 and 10 show several embodiment variants of the example of FIGS. 3A and 3B.

In accordance with a further embodiment of the present invention illustrated in the detail of FIGS. 7 and 10, but also generally referable as a variant of the present invention, polarity reversal is not provided at the electrodes and the flow to be treated F1 sequentially traverses at least two operating chambers delimited by electrodes with opposite polarity in order to allow both the positive and negative ionic particles to traverse the filtering membranes under the action of the electric field. For such purpose, the two operating chambers are advantageously traversed in countercurrent and can be sequentially connected by connector sections made of electrically isolating material, indicated with the dashed line in FIGS. 7 and 10 and of course arranged in positions of the cell that are susceptible to not interfere with the walls 16, 17 that delimit the first evacuation chamber 13.

In operation, the apparatus described up to now mainly from the structural standpoint operates as specified hereinbelow, with reference to the embodiment of FIGS. 3A, 3B.

The positively and negatively charged particles contained in the liquid to be treated F1, which continuously flow into the first and second chamber 4, 5, are forced by the action of the electric field produced by the two electrodes A, B to respectively migrate towards the cathode (negative electrode) and towards the anode (positive electrode). In such migration, the positive cationic particles contained in the fluid of the operating chamber opposite that delimited by the cathode (first operating chamber 4 in accordance with FIG. 3A) and the negative anionic particles contained in the fluid of the operating chamber opposite that delimited by the anode (second operating chamber 5 in accordance with FIG. 3A) which encounter the filtering membranes of the third wall 16 and fourth wall 17 are forced by the electric field to traverse them by passing through the meshes of the material constituting the filtering membranes, until they enter into the first evacuation chamber 13.

Once they have entered into the first evacuation chamber 13, the charged particles are subjected here to a small action of the electric field, and thus they are no longer able to traverse the filtering membranes of the third 16 and fourth wall 17, remaining confined in the substantially equipotential volume of the third chamber 13, before then being conveyed towards the drain by the washing fluid flow F2 which continuously advances into the first evacuation chamber 13.

Through the electric field present in the first and in the second chamber 4, 5, the charged particles present herein are then moved into a volume constituted by the third evacuation chamber 13 with limited electric field, overcoming a check barrier constituted by the filtering membranes of the same walls 16, 17 of the third chamber 13.

Figure 4:
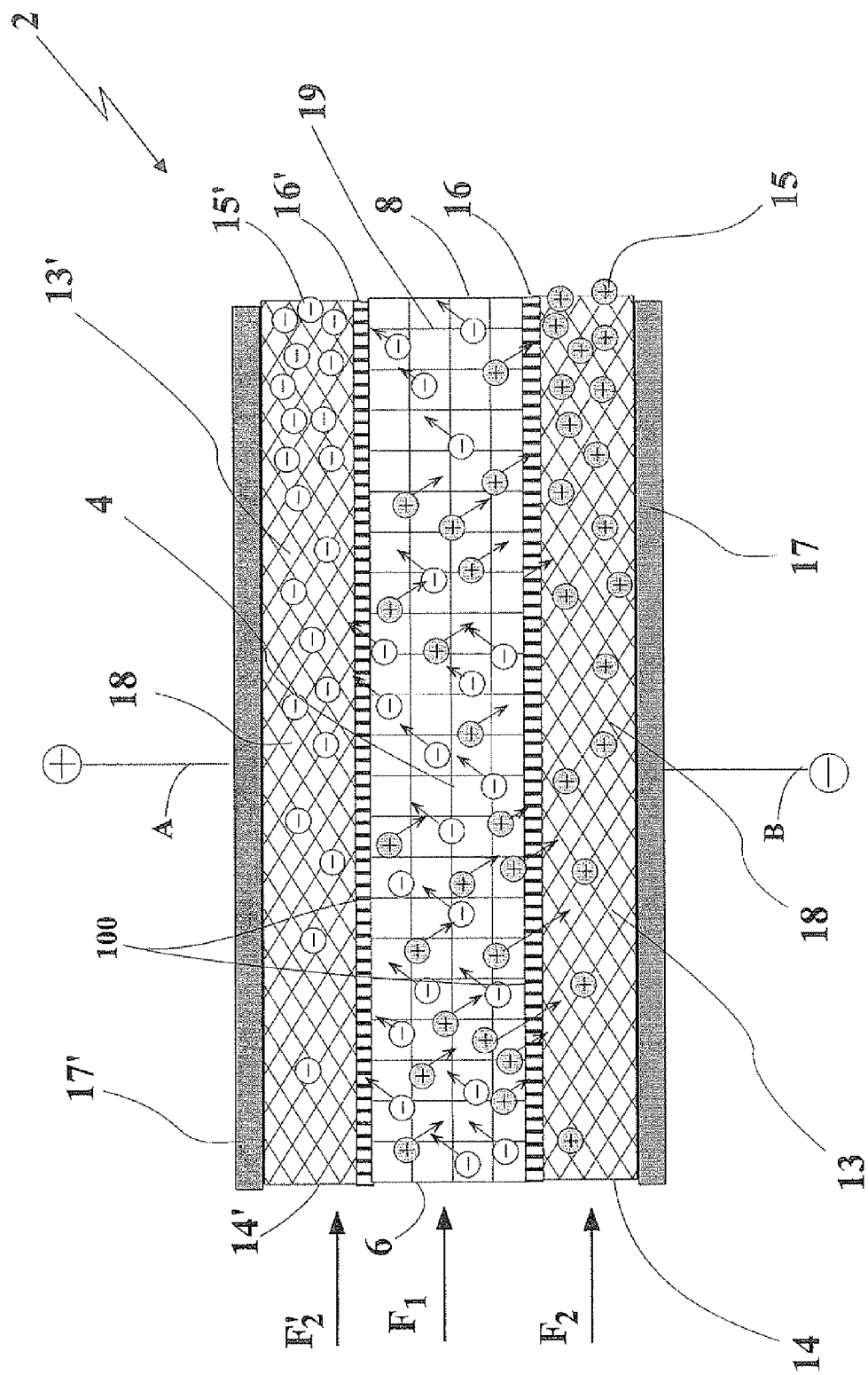
FIG. 4 schematically shows, in a cross section view, a portion of the cell of the apparatus for purifying a fluid object of the present invention in accordance with one embodiment.
Figure 5:
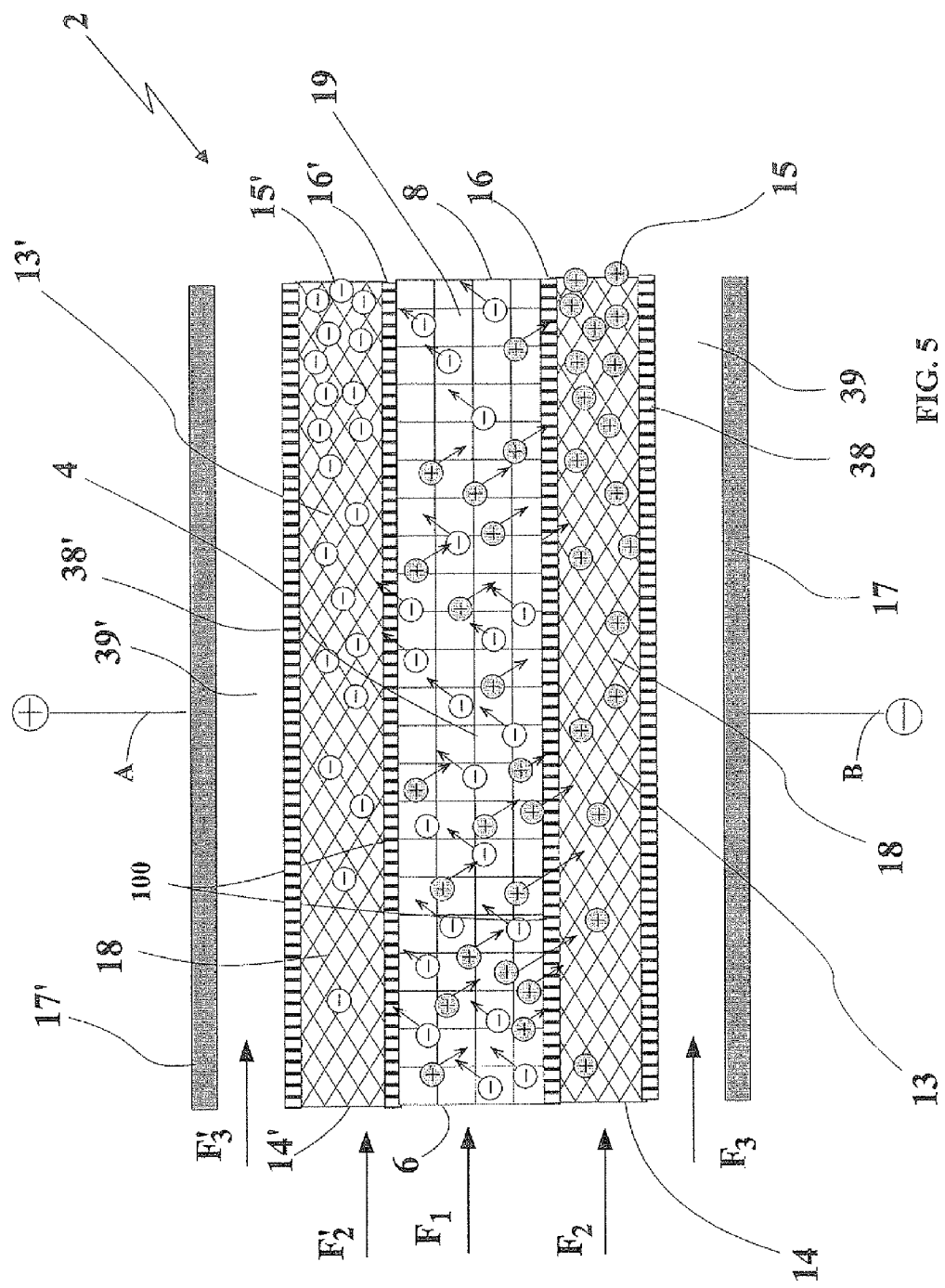
FIG. 5 shows a first embodiment variant of the example of FIG. 4.
Figure 6:
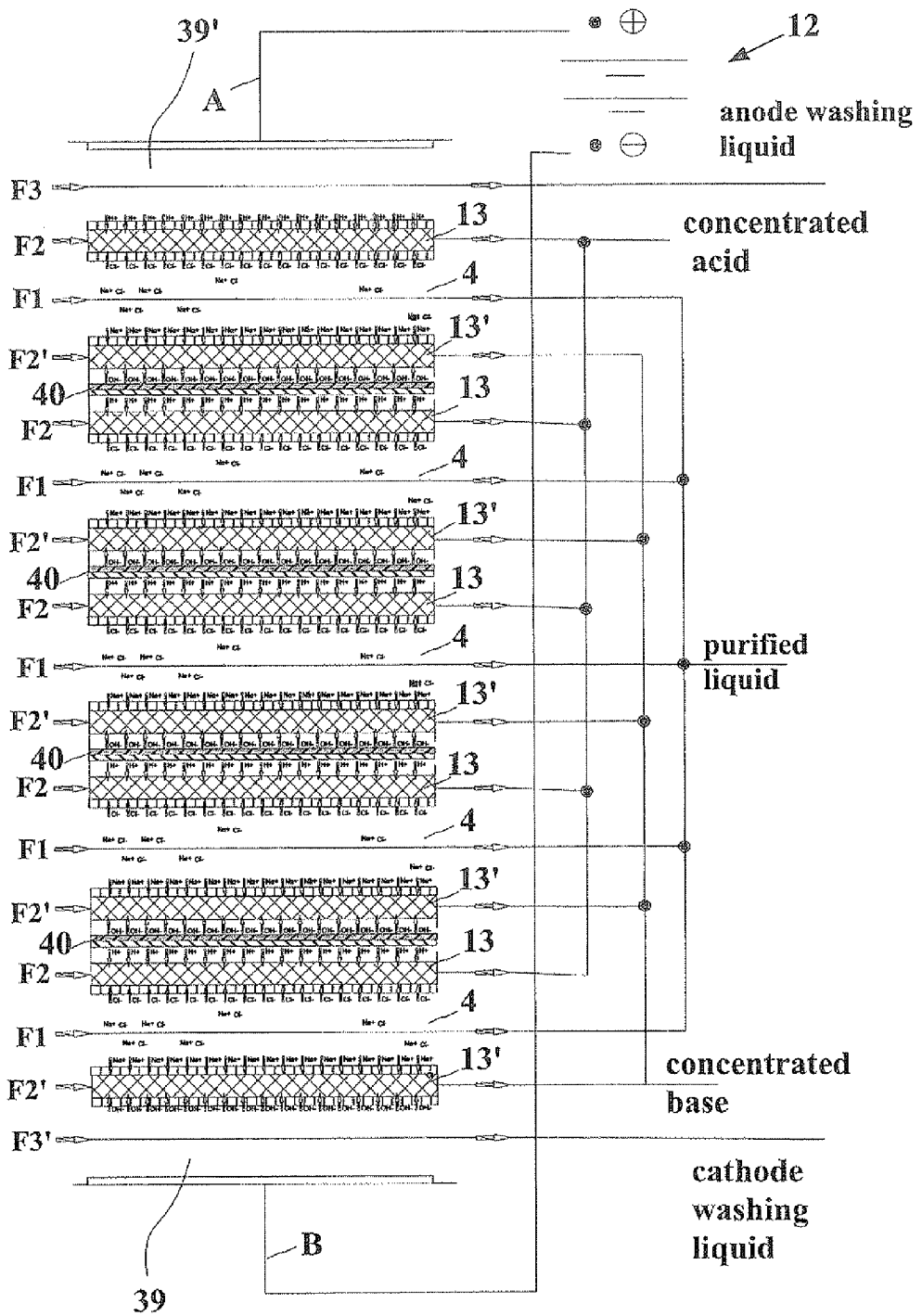
FIG. 6 schematically shows, in perspective view, the apparatus for purifying a fluid in accordance with the embodiment of FIG. 5 in which the elementary layers or cells are repeated in succession.

In accordance with a further embodiment of the invention illustrated in FIGS. 4, 5 and 6, at least one first and one second evacuation chamber 13, 13' are provided (advantageously a succession of such chambers are provided as illustrated in FIG. 6), each delimited by a third wall 16, 16' and a fourth wall 17, 17', respectively provided with a first and a second inlet section 14, 14', with a first and second outlet section 15, 15', through which the second operative fluid F2, F2' flows. The aforesaid third walls 16, 16', respectively of the first and the second evacuation chamber 13, 13', each comprises a filtering membrane 100 and delimit between them the provided at least one operating chamber 4 (and advantageously a succession of such operating chambers 4 as illustrated in FIG. 6), which therefore remains interposed between the first and the second evacuation chamber 13, 13'.

The first electrode and the second electrode A, B are associated with the fourth walls 17, 17' respectively of the first and the second evacuation chamber 13, 13'.

With the term "associated" referred to an electrode and to a wall (in this example or more generally according to the invention), it must be intended that the electrode itself forms the wall or a direct mechanical connection, i.e. without the interposition of other chambers or layers, an indirect mechanical connection, with the interposition of other chambers or layers). In any case, the electric field generated by the electrode A, B will be particularly active with respect to such wall.

In accordance with this embodiment, the electrical power supply source 12 will preferably be susceptible of maintaining unchanged the polarity of the two electrodes A, B in order to force the cationic particles and the anionic particles contained in the operating chamber 4 to enter into respective two different evacuation chambers 13, 13' through respective filtering membranes 100.

In such a manner, as illustrated in FIG. 6, in the two evacuation chambers 13, 13' one can obtain the concentration for example of acids and bases at the outlet of the two corresponding second operative fluids F2 and F2', starting from an operative liquid F1 with a salt dissolved. In the example of FIG. 6, the case of sea water with sodium chloride dissolved is reported. In accordance with the embodiment variant illustrated in FIG. 5, the electrodes A, B are protected by a cover layer 38, 38', it too obtained by a filtering membrane 100, advantageously spaced from the corresponding electrode A, B in order to define therewith a secondary chamber 39, 39' for the passage of at least one washing fluid of the electrode. In the case of the example of FIG. 6, two separate washing flows F3, F3' were provided respectively for the positive electrode A and for the negative electrode B.

As already seen for the general case and illustrated herein in FIG. 6 with reference to the above-described particular embodiment, the apparatus can comprise a plurality of operating chambers 4 and a plurality of evacuation chambers 13, 13', distributed in succession and with, in the case of this example, each operating chamber 4 interposed between two evacuation chambers. Pairs of first and second electrodes A, B electrically in series are provided; in this example, an operating chamber 4 and two evacuation chambers contiguous on opposite sides are interposed.

More clearly, therefore, in the embodiment exemplified in FIGS. 4, 5 and 6, it can be observed that the cell is adapted such that it can separately recover the removed cationic and anionic particles.

In order to transfer relatively large quantities of charged particles, it is possible to connect in parallel to a certain number of base cells; in this manner, nevertheless, the overall operative current could reach high values. Since the cost of a power supplier increases with the increase of the operative current, to a greater extent than that which occurs with the increase in voltage, it is recommended to electrically connect the cells together in series. Also the electrodes represent a considerable cost in making the cells, since they require electrical connections to the power supply.

The intermediate electrodes A, B of the succession of pairs of electrodes A, B can be substituted or better yet obtained by means of a bipolar membrane 40.

In FIG. 6, a cell is described that provides for the connection in series and the use of bipolar membranes 40 instead of conventional electrodes.

It is known that the bipolar membranes are constituted by the joining of cation and anion exchange membranes by means of a rolling process. Creating an electric field with suitable potential difference, these membranes are capable of generating H+ and OH− ions, separating the water.

More in detail, in accordance with such embodiment illustrated in FIG. 6, it is possible to superimpose a plurality of operating chambers 4 and evacuation chambers 13, 13', preventing the insertion of the electrodes in each chamber group but exploiting the capacity of the bipolar membranes to separate water into Hydrogen and Hydroxyl ions and then close the electric circuit of the connection in series, while maintaining the superimposed chambers separated from the chemical standpoint. In this manner, one will obtain an electrically in series connection of the chambers while it becomes possible to select a hydraulic connection of the chambers both in parallel and at least partially in series.

For this purpose, in FIG. 4, one can observe the presence of only one operating chamber 4 for two chambers 13 and 13' respectively intended for the recovery of the particles with positive and negative charge.

The insertion is observed of two further chambers 39 and 39' intended for washing the electrodes in order to prevent possible gas bubbles (emitted in case the operating voltage is increased in order to increase the purification efficiency/output) from partially isolating the electrode or causing excessive internal pressures. Advantageously the two second operative flows F2 and F' can be partially recirculated in order to increase the concentration of the recovered acids and bases.

The washing flows F3 and F3' can in turn be recirculated and possibly also crossed if advantageous.

The first operative flow F1 conveys the liquid to be purified, from which the ionized particles will be extracted.

By coupling these membranes to the evacuation chambers 13, as indicated in FIG. 6, one can create a basic unit composed of two evacuation chambers 13 and 13' and an operating chamber 4. The chambers 13, 13' are respectively delimited on the cationic side with a bipolar membrane in a chamber and on the anionic side with the subsequent bipolar membrane in the opposite chamber. Both chambers 13, 13' are facing a same operating chamber 4. The chambers 13 and 13' are opposite each other and each is separated from the upper 13' and lower 13 evacuation chamber of the series by a bipolar membrane that substitutes the two electrodes and the respective electrical connection in the connection in series. The bipolar membrane will have opposite insertion sense between the lower chamber and upper chamber. In the two evacuation chambers 13, 13', two second operative flows, respectively F2 and F2', will flow; these will convey the acidic and basic particles thus separated. This basic unit can be duplicated "n" times, thus rendering the apparatus more effective.

The bipolar membranes are capable of operating at rather high current densities, up to 30-50 ma/cm2. And at these current densities, they maintain a voltage at their ends that is on the order of 1-1.2V based on the density of operative current. The evacuation chambers 13, 13' however maintain at their ends a voltage that is close to zero (or in any case quite low). This fact makes the apparatus 1 according to the invention very efficient, if compared to the conventional electrodialysis cells which, due to the ion exchange membranes present, cannot reach comparable current densities or they sustain voltage drops due to the membranes that are certainly much bigger.

A typical cationic membrane often exceeds 10 ohm/cm2 and hence at a current density of 30 ma/cm2 generates a drop of 0.3V. Given that a cell of electrodialysis with bipolar membranes uses at least two membranes (one cationic and one anionic), there is clear energy savings obtainable with the described configuration, object of the present invention.

Another advantage of the present finding is to be able to easily operate on organic solutions where there are charged particles with often high molecular weight, which due to their nature cannot easily traverse a conventional ion exchange membrane.

Illustrated in FIGS. 13-16 is a variant of the embodiment of the enclosed FIGS. 3A, 3B, 7, 8, 9 and 10. With reference to such variant, the operative fluid F1 is advantageously the fluid to be treated containing cationic particles and/or anionic particles, such as water with a high degree of mineralization, i.e. mineral salts dissolved therein, and in particular with high hardness or with high quantities of calcium and magnesium salts contained therein, while the operative fluid F2 is the washing fluid.

In accordance with this embodiment, the third and fourth wall 16, 17, which together delimit the third chamber 13 and which together with the first wall 10 and the second wall 11 respectively delimit the first operating chamber 4 and the second operating chamber 5, are substantially impermeable.

With the term substantially impermeable it must be intended that there can be a flow leakage between the third evacuation chamber 13 and one or both operating chambers 4, 5 comprised between 0 and 20%.

Preferably the pressure in the third evacuation chamber 13 will be adjusted to a value less than that of the two operating chambers 4, 5 so as to prevent or limit a fluid leakage from such third evacuation chamber 13 to the two operating chambers 4,5.

Therefore, the above-described configuration of the cell 2 provides for making the washing fluid F2 flow into a third evacuation chamber 13 interposed contiguously between the two operating chambers 4, 5 where the fluid F1 to be treated transits; fluid F2 is separated from fluid F2 by means of the third and the fourth wall 16, 17 which are substantially impermeable to the fluid. F1 and to the washing fluid F2 but which allow the selective traversing, under the action of the electric field generated by the electrodes 10, 11, of the ions contained in the fluid to be treated F1.

For such purpose, the third and the fourth wall 16, 17 each have one or more ion-selective areas associated, such areas susceptible of being traversed by charged particles with corresponding polarity contained in the first and in the second operating chamber 4 and 5; the action of the electric field generated by the electrodes 10, 11 acts on such particles. At the same time, the ion-selective areas are adapted to retain, within the same third evacuation chamber 13, the cationic particles or the anionic particles, even if with polarity corresponding to the membrane, keeping them inside the same third evacuation chamber, due to the small movement force induced thereon by the electric field when the charged particles are contained in the third evacuation chamber 13. With the term "corresponding polarity" it is intended to consider that the anionic ion-selective membrane is more easily permeable to anions than cations and vice versa the cationic ion-selective membrane is more easily permeable to cations than anions.

Inside the third evacuation chamber 13, the above-described porous electrical conductor 18 is contained. It is susceptible of being traversed by the washing fluid F2, it is interposed between the third and the fourth wall 16, 17 and is in close electrical contact with the same third and the fourth wall 16, 17, thus reducing, inside the third evacuation chamber 13, the electric field generated by the first and by the second electrode 10, 11. Such porous electrical conductor determines a shielding effect of the electric field for the volume subtended between the third and the fourth wall 16, 17 such that the charged particles contained in the third evacuation chamber 13 do not have the force to overcome the ion-selective areas, with low electrical resistivity, of the third and fourth wall 16, 17 even though they have corresponding polarity.

The ion-selective areas are a good electrical conductor and therefore extend the shielding outside the third evacuation chamber 13 up to the outer surface of the third and fourth separation wall 16, 17 with the fluid to be treated F1 that flows into the two operating chambers 4, 5 which of course has higher resistivity.

The ion-selective areas of the third and fourth wall 16, 17 are advantageously obtained with membranes selectively of anionic exchange type and of cationic exchange type, each of which can be extended for the entire area of an electrode or, otherwise, each can regard portions of both electrodes as will be clarified in the examples reported hereinbelow.

In accordance with a possible embodiment selection, the third and the fourth wall 16, 17 of the third evacuation chamber 13 each comprise a sheet-form support on which prints of ion-selective areas are provided, and in particular for example silk screens of ion-selective areas, obtained starting from anionic and cationic ion-selective paints, for example of the type described in the patent EP 2463242 in the paragraphs 18-28 enclosed here for reference purposes. Such anionic and cationic ion-selective areas thus obtained can each cover the entire extension of an electrode or they can regard adjacent portions with different ion-selectivity of each electrode, in accordance with the two embodiment selections specified hereinbelow.

The sheet-form support can for example be made with a TNT sheet of 10-30 grams per $m^2$, preferably electrically conductive, with the ion-selective areas—obtained by means of silk screen printing, or more generally by means of a printing process—preferably made of a material that is substantially electrically conductive.

As in the above-described case of the enclosed FIGS. 3A, 3B, 7, 8, 9 and 10, the abovementioned cell 2 is advantageously obtained by means of a plurality of superimposed purification layers, affected upstream and downstream by a common hydraulic circuit.

The two supply liquids of the cell, i.e. the liquid to be treated F1 and the washing liquid F2) can also be constituted by the same liquid (e.g. water to be treated and washing water), also by arranging a common supply.

Figure 14:
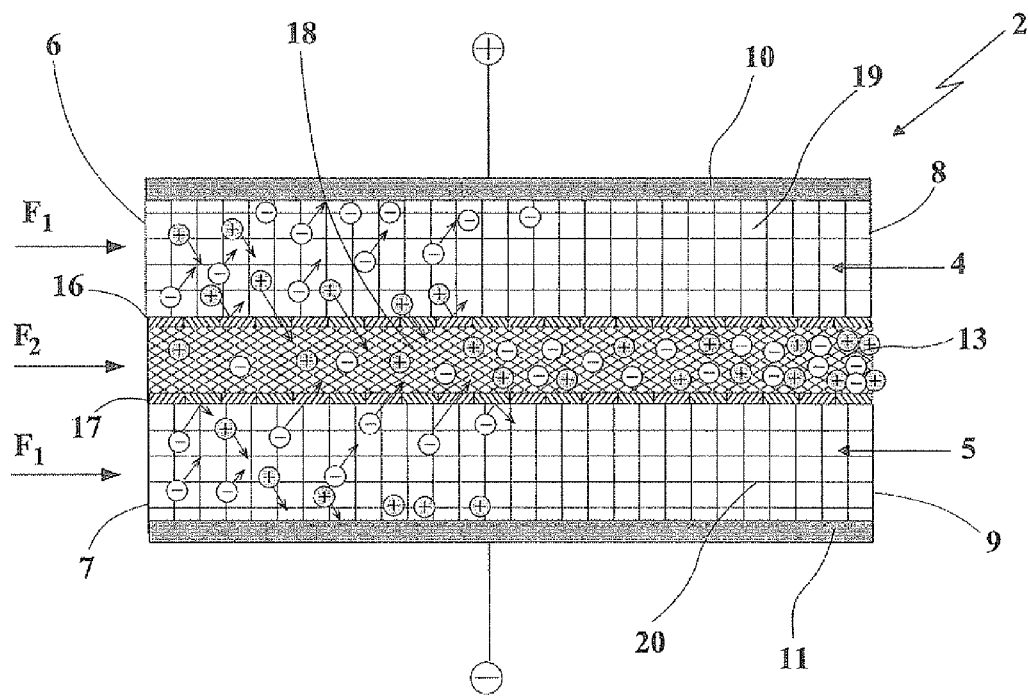
FIGS. 14 and 15 schematically show, in cross section views, a portion of the cell of the apparatus for purifying a fluid of FIG. 13 in two different operative moments.
Figure 15:
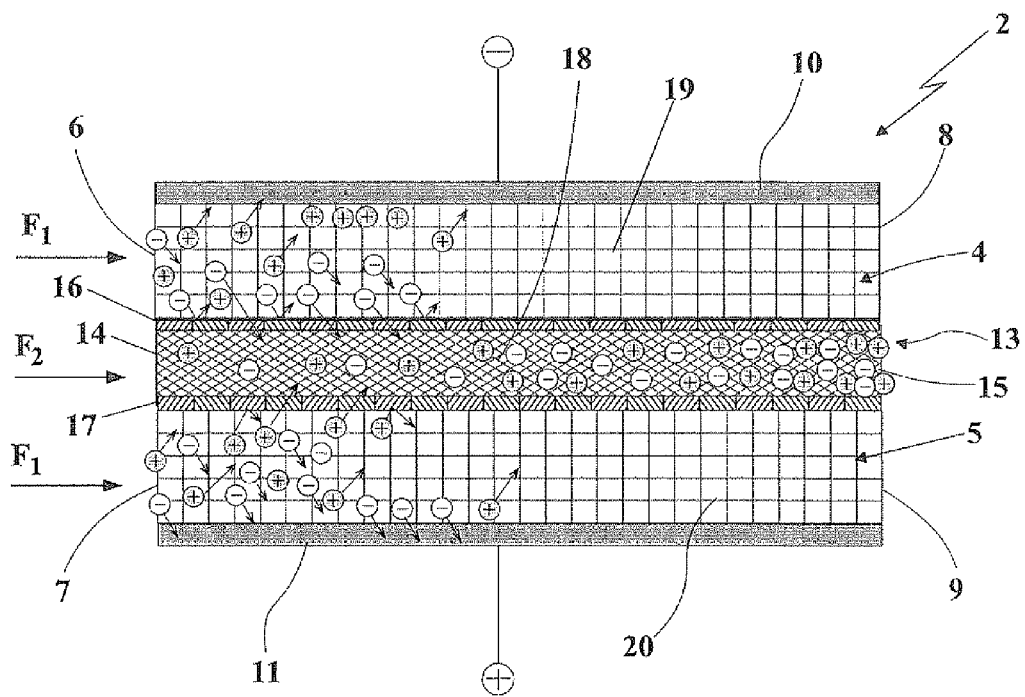
Figure 16:
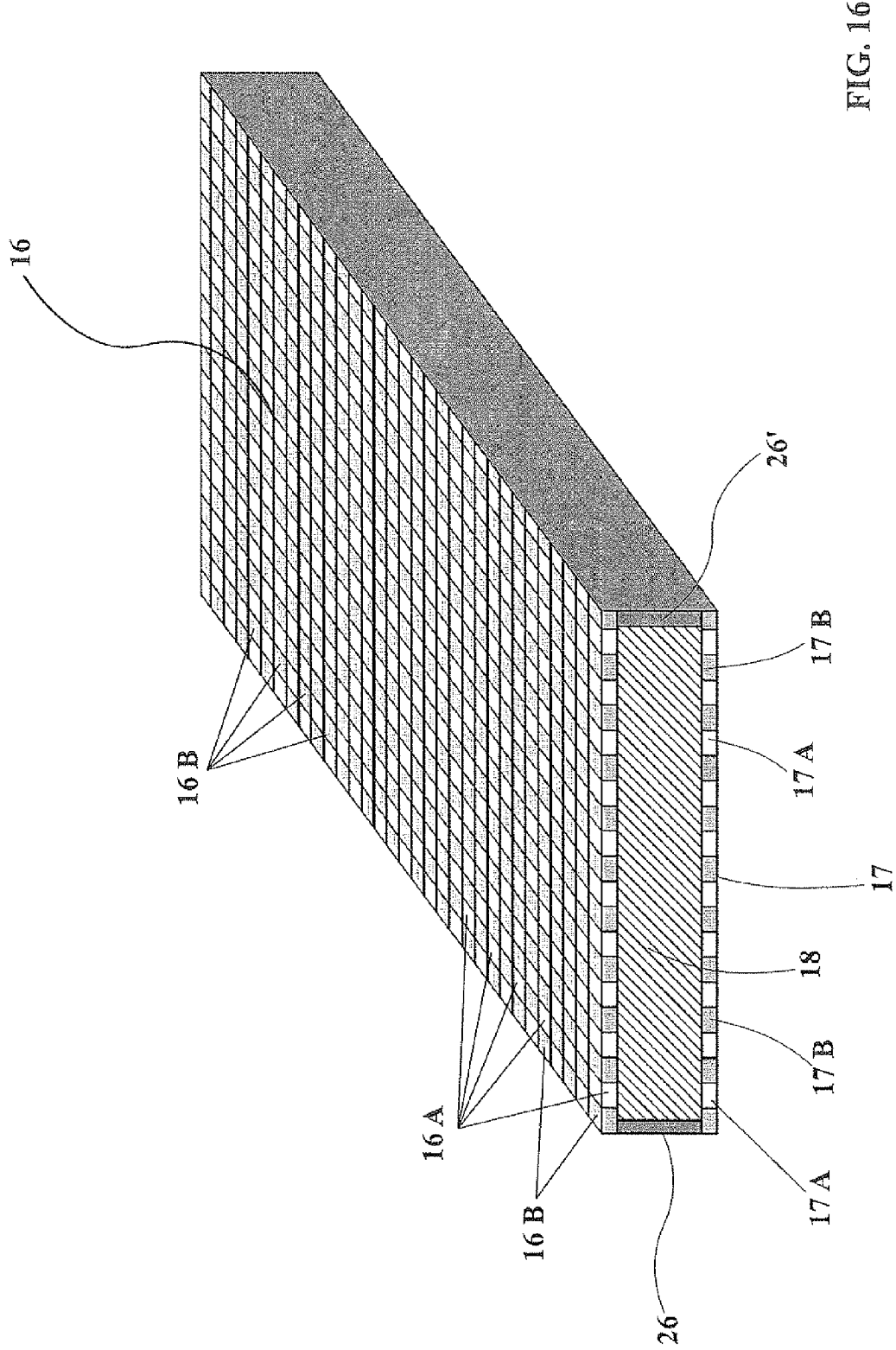
FIG. 16 schematically shows a detail of the apparatus for purifying a fluid of FIG. 13 relative to an evacuation chamber with substantially equipotential volume of a cell.

In accordance with a first embodiment of the aforesaid variant of FIGS. 13-16 illustrated in the FIGS. 14, 15 and 16, the third and the fourth wall 16, 17 are each provided with two or more adjacent ion-selective areas, and preferably with a plurality of adjacent ion-selective areas, respectively indicated with 16A, 16B and 17A, 17B, of which at least one is anionic 16A, 17A or cation-phobic (indicated with tilted lines rising towards the right in the enclosed FIGS. 4A, 4B) and at least one is cationic 16B, 17B or anion-phobic (indicated with tilted lines rising towards the left in the enclosed FIGS. 4A, 4B).

In accordance with such embodiment, i.e. in the presence of ion-selective areas with opposite polarity on each third and fourth wall 16, 17, the electrical power supply source 12 is advantageously susceptible of periodically reversing the polarities of the first and second electrode 10, 11 in order to force the cationic particles and the anionic particles contained in the first and second operating chamber 4, 5 to enter into the third chamber 13, by traversing the corresponding ion-selective area 16A, 16B and 17A, 17B.

Preferably, in accordance with the aforesaid embodiment, the polarity reversal frequency varies in an interval comprised between 0.5 Hz and 100 Hz.

In accordance with this embodiment, the two operating chambers 4, 5 are traversed in parallel by the fluid to be treated F1 since the anionic and cationic particles, due to the polarity reversal and to the presence of ion-selective areas with opposite polarity on each wall that delimits the third evacuation chamber 13, can enter into the latter chamber 13 in order to then be removed, whether they are coming from both the first or the second operating chamber 4, 5.

Of course, the single purification layer of the cell 2 schematized for example in FIGS. 12, 14 and 15 can be repeated n times as illustrated in FIG. 11 in order to obtain a greater filtering action. In this case, preferably, as illustrated in the same FIG. 11, each intermediate electrode 10, 11 (except for only the final electrodes) will act as containment wall for two first operating chambers 4 or for two second operating chambers 5 of two adjacent and consecutive purification layers.

Preferably, in addition, the second extraction section 24 is extended substantially transverse to the purification layers, preferably in a central zone of the chambers 4, 5, 13, traversing the first 10, the second 11, the third 16 and the fourth wall 17 with corresponding through holes. Otherwise, in accordance with a second embodiment of the aforesaid variant of FIGS. 13-16, the ion-selective areas with opposite polarity are each associated with the entire extension of an electrode 10, 11. In this case, polarity reversal is not provided at the electrodes (equivalent to the example of FIG. 10) and the flow to be treated F1 sequentially traverses at least two operating chambers delimited by electrodes with opposite polarity in order to allow both the positive and negative ionic particles to traverse the ion-selective areas with corresponding polarity under the action of the electric field. For such purpose, the two operating chambers can be traversed in countercurrent and can be sequentially connected by connector sections made of electrically isolating material, indicated with dashed line in FIG. 10 and of course arranged in positions of the cell that are susceptible to not interfere with the walls 16, 17 that delimit the third evacuation chamber 13.

Functionally, the apparatus described up to now mainly from the structural standpoint operates as specified hereinbelow, with reference to both embodiments of the variant of FIGS. 13-16.

The positively and negatively charged particles contained in the liquid to be treated F1, which continuously flow into the first and second chamber 4, 5, are forced by the action of the electric field produced by the two electrodes 10, 11 to migrate respectively towards the cathode (negative electrode) and towards the anode (positive electrode). In such migration, the positive cationic particles contained in the fluid of the operating chamber opposite that delimited by the cathode (first operating chamber 16 in accordance with FIG. 4A) and the negative anionic particles contained in the fluid of the operating chamber opposite that delimited by the anode (second operating chamber 17 in accordance with FIG. 4A) which encounter the ion-selective areas, respectively cationic (16B) and anionic (17A) of the corresponding third wall 16 and fourth wall 17, are forced by the electric field to traverse them, overcoming the potential barrier, represented by the ion-selective area, until they enter into the third evacuation chamber 13.

Once they have entered into the third evacuation chamber 13, the charged particles are subjected here to a small action of the electric field, and thus they are no longer able to traverse the ion-selective areas of the third 16 and fourth wall 17, remaining confined in the substantially equipotential volume of the third chamber 13, before then being conveyed towards the drain by the washing fluid flow F2 which continuously advances in the third evacuation chamber 13.

Through the electric field present in the first and in the second chamber 4, 5, the charged particles present herein are then moved into a volume constituted by the third evacuation chamber 13 with limited electric field, overcoming a check barrier allowed by the ion-selective areas of the same walls of the third chamber 13.

The porous electric layer 18, advantageously constituted in accordance with the abovementioned preferred embodiment by a metal net, determines the isopotentiality of the third chamber 13, like a Faraday cage, with shielding of the electric field in order to prevent conducting the charged particles to outside the same chamber 13 once they have entered inside.

Also forming an object of the present invention is a method for purifying a fluid, which in particular can advantageously but not exclusively employ the above-described apparatus 1; for the sake of simplicity, the same reference numbers and nomenclature of the apparatus 1 will be maintained hereinbelow.

The aforesaid method, according to the idea underlying the present invention, provides for the following operations.

The continuous flow is provided of the first operative fluid F1 containing cationic particles and anionic particles through at least one operating chamber 4 (or multiple operating chambers 4, 5 in accordance with the above-described examples) from the respective inlet opening to the respective outlet opening, as well as the flow of a second operative fluid through at least one evacuation chamber 13 (or multiple evacuation chambers 13, 13' in accordance with the above-described examples), from its inlet section 14 to its outlet section 15.

The evacuation chamber 13 at its interior comprises the porous electrical conductor 18, which is thus traversed by the second operative fluid F2, and is separated from the operating chamber 4 by the filtering membrane 100.

The method provides for the generation of an electric field between the two electrodes A, B (or between a plurality of pairs of electrodes in accordance with the above-reported examples) between which at least one operating chamber and at least one evacuation chamber 13 are interposed.

For such purpose, electrodes A, B are direct voltage or average direct voltage power supplied with opposite polarities, in a manner such that the porous electrical conductor 18 is susceptible of reducing, inside the evacuation chamber 13, the electric field generated by the electrodes.

There is then a migration into the evacuation chamber 13, by traversing the filtering membrane 100, of at least one part of the charged particles under the action of the operative electric field during the flow of the first operative fluid F1 into the operating chamber 4. It is thus possible to obtain the evacuation, through the passage of the second operative fluid F2, of the charged particles migrated through the filtering membrane 100 into the evacuation chamber 13 and subjected herein to the action of the limited electric field.

The generation of the electric field can occur with periodic reversal of the polarity at the electrodes A, B in order to force the charged particles with opposite polarity to migrate through a same filtering membrane 100 at different times, passing from the operating chamber 4 to the evacuation chamber 13.

More in detail, in accordance with the embodiment illustrated in the enclosed FIGS. 3A, 3B, 7, 8, 9 and 10, the generation of an electric field is provided between the electrodes A, B associated with the first and second wall of the two operating chambers 4, 5 by means of direct voltage power supply or average direct voltage power supply of the same electrodes with opposite polarities.

There is thus the migration of at least part of the cationic particles and/or anionic particles contained in the two operating chambers 4, 5 under the action of the electric field, during the flow of the first operative fluid F1 into the aforesaid operating chambers 4, 5, with their movement from the first and from the second operating chamber 4, 5 to the first evacuation chamber 13, by traversing the filtering membranes under the action of the electric field generated by the electrodes A, B.

Figure 3:
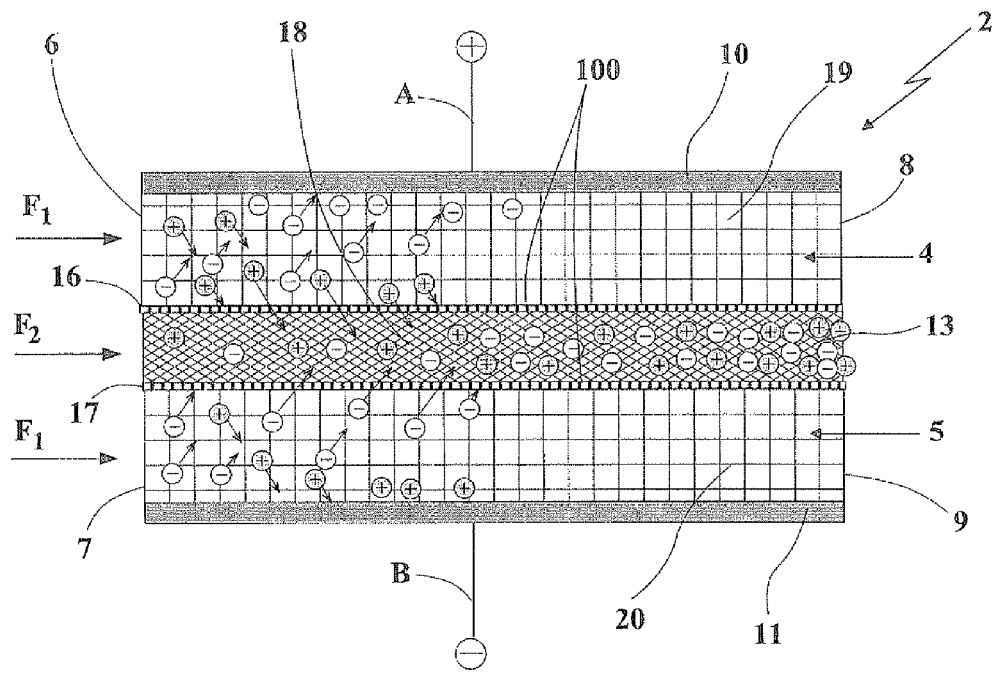
FIGS. 3A and 3B schematically show, in two cross section views, a portion of the cell of the apparatus for purifying a fluid object of the present invention in two different operative moments in accordance with a first embodiment.
Figure 3:
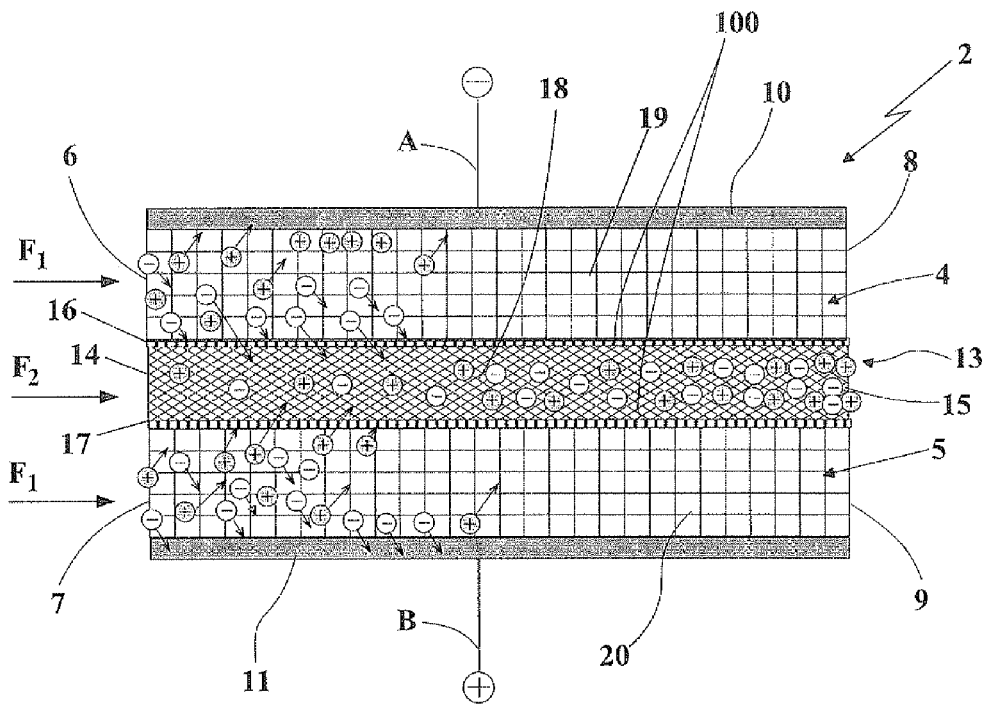

In accordance with the embodiment illustrated in the FIGS. 3A, 3B, the flow of the first operative fluid F1 occurs in parallel into the two operating chambers 4, 5; otherwise, in accordance with the embodiment illustrated in FIG. 7, the flow of the first operative fluid F1 occurs sequentially into at least two operating chambers 4, 5 delimited by electrodes with opposite polarity. The traversing sequence provides for the passage of the fluid first through all or only a group of operating chambers at a first same polarity of the purification layers, and then subsequently the passage of the fluid through all or only a group of operating chambers at the second polarity of the purification layers.

There follows the treatment of the cationic particles and/or anionic particles which have migrated into the first evacuation chamber 13 passing through the filtering membranes provided with the third and fourth wall 16, 17, due to the barrier action exerted by the same filtering membranes contained in the first evacuation chamber 13 and subjected herein to the action of the limited electric field due to the shielding effect produced by the porous electrical conductor 18.

In the case of FIGS. 3A and 3B, in which the generation of the electric field occurs with periodic reversal of the polarity at the electrodes A, B, there is a migration both of the cationic particles and of the anionic particles contained in the first and second operating chamber 4, 5 towards the first evacuation chamber 13 by traversing the filtering membranes both of the third and fourth wall 16, 17.

The method for purifying a fluid according to the embodiment of FIGS. 13-16 provides for the following operations.

The continuous flow is provided of the fluid to be treated F1, containing cationic particles and anionic particles, through the first operating chamber 4 and the second operating chamber 5, as described above, from their respective first and second inlet openings 6, 7 to their first and second outlet openings 8, 9; also provided is the flow of a washing fluid F2 through the third evacuation chamber 13, as described above, from its third inlet opening 14 to its third outlet opening 15.

More in detail, in accordance with the first embodiment of the aforesaid variant of FIGS. 13-16, i.e. illustrated in FIGS. 14, 15 and 16 in which the third and fourth wall 16, 17 are each provided with two or more side-by-side ion-selective areas, the flow of the fluid to be treated F1 occurs in parallel in the different operating chambers 4, 5.

Otherwise, in accordance with the second embodiment of the aforesaid variant of FIGS. 13-16, i.e. with the ion-selective areas with opposite polarity each associated with the entire extension of an electrode 10, 11, the flow of the fluid to be treated F1 occurs sequentially in at least two operating chambers delimited by electrodes with opposite polarity. The traversing sequence can provide for the passage of the fluid first through all or only a group of operating chambers with a first same polarity of the purification layers and then subsequently the passage of the fluid through all or only a group of operating chambers with the second polarity of the purification layers.

It is then provided, for both embodiments, to generate an electric field between the electrodes 10, 11 associated with the first and the second wall of the two operating chambers 4, 5 by means of direct voltage power supply, or average direct power supply, of the same electrodes with opposite polarities.

Thus, there is the migration of at least part of the cationic particles and/or anionic particles contained in the two operating chambers 4, 5 under the action of the electric field, during the flow of the fluid to be treated F1 into the aforesaid operating chambers 4, 5, with their movement from the first and from the second operating chamber 4, 5 to the third evacuation chamber 13, traversing the ion-selective areas with corresponding polarity under the action of the electric field generated by the electrodes 10, 11.

There follows the retention of the cationic particles and/or of the anionic particles that migrated into the third evacuation chamber 13, passing through the ion-selective areas provided for on the third and fourth wall 16, 17, due to the barrier action exerted by the same ion-selective areas towards the charged particles with corresponding polarity contained in the third evacuation chamber 13 and subjected therein to the action of the electric field limited due to the shielding effect produced by the porous electrical conductor 18.

More in detail, in accordance with the first embodiment described above, in which multiple ion-selective areas are provided on both the third and fourth wall defining the third evacuation chamber 13, the generation of the electric field occurs with periodic reversal of the polarity at the electrodes 10, 11. Consequently, the migration forces the cationic particles and the anionic particles contained in the first and second operating chambers 4, 5 to enter into the third evacuation chamber 13 by traversing ion-selective areas provided adjacent on each third and fourth wall 16, 17, of which at least one is cation-phobic and at least one is anion-phobic. The apparatus and the method thus conceived therefore attain the pre-established objects. In particular, by providing for a continuous operation, the apparatus allows considerably increasing the efficiency/output with respect to apparatuses of known type operating in intermittent manner, such as the apparatuses with flow-through capacitors.

In addition, the apparatus according to the invention does not provide for forcing a fluid flow against the filtering membranes, as instead is provided for by the apparatuses that employ the principle of electrodialysis; consequently, the apparatus, object of the present invention, does not lead to any particular obstruction of the same filtering membranes, i.e. it does not require costly maintenance work. The same net of the porous electrical conductor 18 is adapted to prevent the obstruction of the walls 16, 17 that it spaces.

Advantageously, inside the evacuation chamber 13, both ionic species absorbed from the contiguous operating chambers 4, 5 are found, so that excessively acidic or alkaline solutions are not obtained, i.e. fouling problems are avoided. This is particularly in accordance with the first embodiment described above, since the presence of a variable electric field does not allow the development of considerable variations in the ionic balance of the first operative fluid.

The components employed by the apparatus, object of the present invention, allow obtaining cells at extremely limited costs.

Given that double layers of ionization are not provided for, as in the apparatuses with flow-through capacitors, it is not necessary to provide high current peaks with the power supply source, and consequently it is not necessary to employ costly electronics.

The invention claimed is:

1. Apparatus for purifying a fluid, the apparatus comprising:
   at least one ion absorption cell (2) traversed by at least one first operative fluid (F1) containing charged particles, and at least one second operative fluid (F2, F2'), said ion absorption cell (2) being provided with a containment structure (3) defining at its interior;
   at least one operating chamber (4, 5) provided with an inlet opening (6, 7) and an outlet opening (8, 9), through which said at least one first operative fluid (F1) is susceptible to flow;
   at least one evacuation chamber (13, 13') for evacuating said charged particles, which is provided with an inlet opening (14, 14') and with an outlet opening (15, 15'), through which said at least one second operative fluid (F2, F2') flows;
   said at least one operating chamber (4, 5) and said at least one evacuation chamber (13, 13') being separated from each other by at least one filtering membrane (100);
   a porous electrical conductor (18) housed in said at least one evacuation chamber (13, 13') and traversed by said at least one second operative fluid (F2, F2'),
   a first and a second electrode (A, B) separated from each other with said at least one operating chamber (4, 5) and said at least one evacuation chamber (13, 13') interposed, and suppliable with power by an electrical power supply source (12) with opposite polarities in order to generate an operative electric field in said at least one operating chamber (4, 5) and an electric field in said at least one evacuation chamber (13, 13'), with value lower than said operative electric field, due to the shielding effect of said porous electrical conductor (18);
   the charged particles contained in said operating chamber (4, 5) being susceptible of traversing said filtering membrane (100) under the action of the operative electric field generated by said first and second electrode (A, B), of being evacuated by said at least one second operative fluid (F2, F2') in said at least one evacuation chamber (13, 13'), in which they are subjected to the action of said electric field;
   wherein said filtering membranes (100) are selected from the group consisting of microfiltration membranes, ultrafiltration membranes, nanofiltration membranes and reverse osmosis membranes.

2. Apparatus for purifying a fluid according to claim 1, wherein said at least one operating chamber (4, 5) comprises at least one first operating chamber (4) and at least one second operating chamber (5), respectively provided with: a first and a second inlet opening (6, 7); a first and a second outlet opening (8, 9), through which said at least one first operative fluid (F1) flows; wherein said first inlet opening (6) is the inlet opening of said first operating chamber (4), said first outlet opening (8) is the outlet opening of said first operating chamber (4), said second inlet opening (7) is the inlet opening of said second operating chamber (5), and said second outlet opening (9) is the outlet opening of said second operating chamber (5);
   wherein said first operating chamber (4) comprises a first wall (10) provided with said first electrode (A), and said second operating chamber (5) comprises a second wall (11) provided with said second electrode (B);
   said at least one evacuation chamber (13, 13') being for evacuating cationic particles and/or anionic particles, wherein said at least one chamber (13, 13') is interposed between said first and second operating chamber (4, 5) and is provided with a third (16, 16') and a fourth wall (17, 17'), each of said third (16, 16') and fourth (17, 17') walls comprising said filtering membrane (100);
   wherein said third wall (16) delimits, together with said first wall (10), said first operating chamber (4), and wherein said fourth wall (17) delimits, together with said second wall (11), said second operating chamber (5).

3. Apparatus for purifying a fluid according to claim 1, further comprising
   at least one first and one second, evacuation chamber (13, 13'), each delimited by a third wall (16, 16') and a fourth wall (17, 17'), wherein said at least one first and one second evacuation chambers (13, 13') are respectively provided with a first and a second inlet opening (34, 14'), and a first and second outlet opening (15,35'), through which said at least one second operative fluid (F2, F2') flows
   at least said third walls (16, 16') respectively of said first and said second evacuation chamber (13, 13') each comprising a filtering membrane (100) and between them delimiting said at least one operating chamber (4) interposed between said first and second evacuation chamber (13, 13');
   wherein the fourth walls (17, 17') respectively of said first and said second evacuation chamber (13, 13') are provided with said first electrode and said second electrode (A, B).

4. Apparatus for purifying a fluid, the apparatus comprising:
   at least one ion absorption cell (2) traversed by at least one first operative fluid (F1) containing charged particles, and at least one second operative fluid (F2, F2'), said ion absorption cell (2) being provided with a containment structure (3) defining at its interior:
   at least one operating chamber (4, 5) provided with an inlet opening (6, 7) and an outlet opening (8, 9), through which said at least one first operative fluid (F1) is susceptible to flow;
   at least one evacuation chamber (13, 13') for evacuating said charged particles, which is provided with an inlet opening (14, 14') and with an outlet opening (15, 15'), through which said at least one second operative fluid (F2, F2') flows;
   said at least one operating chamber (4, 5) and said at least one evacuation chamber (13, 13') being separated from each other by at least one membrane (100);
   a porous electrical conductor (18) housed in said at least one evacuation chamber (13, 13') and traversed by said at least one second operative fluid (F2, F2'),
   a first and a second electrode (A, B) separated from each other with said at least one operating chamber (4, 5) and said at least one evacuation chamber (13, 13') interposed, and suppliable with power by an electrical power supply source (12) with opposite polarities in order to generate an operative electric field in said at least one operating chamber (4, 5) and an electric field in said at least one evacuation chamber (13, 13'), with value lower than said operative electric field, due to the shielding effect of said porous electrical conductor (18);
   the charged particles contained in said operating chamber (4, 5) being susceptible of traversing said membrane (100) under the action of the operative electric field generated by said first and second electrode (A, B), of being evacuated by said at least one second operative fluid (F2, F2') in said at least one evacuation chamber (13, 13'), in which they are subjected to the action of said electric field;

wherein said electrical power supply source (12) is con-figure configured for periodically reversing the polarities of said first and second electrode (A, B) with a polarity reversal frequency comprised in an interval between 0.5 Hz and 100 Hz, in order to force cationic particles and anionic particles contained in said at least one operating chamber (4, 5) to enter into said at least one evacuation chamber (13, 13') through said at least one membrane (100).

5. Apparatus for purifying a fluid according to claim 1, wherein said electrodes (A, B) are protected by a cover layer (38, 38').

6. Apparatus for purifying a fluid according to claim 5, wherein each said cover layer (38, 38') is spaced from the corresponding said electrode (A, B) in order to define therewith a secondary chamber (39, 39') for the passage of at least one washing fluid (F3, F3').

7. Apparatus for purifying a fluid according to claim 1, wherein the pressure in said at least one first evacuation chamber (13, 13') is adjusted with respect to the pressure in said at least one operating chamber (4, 5) to a value susceptible of limiting the leakage of operative flows (F1, F2) through said filtering membrane (100).

8. Apparatus for purifying a fluid according to claim 1, further comprising a plurality of operating chambers (4, 5) and a plurality of evacuation chambers (13, 13'), distributed in succession alternated with each other, wherein said at least one operating chamber (4, 5) and said at least one evacuation chamber (13, 13') are interposed between a correspondent pair of said first and second electrodes (A, B) electrically in series.

9. Apparatus for purifying a fluid, the apparatus comprising:
at least one ion absorption cell (2) traversed by at least one first operative fluid (F1) containing charged particles, and at least one second operative fluid (F2, F2'), said ion absorption cell (2) being provided with a containment structure (3) defining at its interior:
at least one operating chamber (4, 5) provided with an inlet opening (6, 7) and an outlet opening (8, 9), through which said at least one first operative fluid (F1) is susceptible to flow;
at least one evacuation chamber (13, 13') for evacuating said charged particles, which is provided with an inlet opening (14, 14') and with an outlet opening (15, 15'), through which said at least one second operative fluid (F2, F2') flows;
said at least one operating chamber (4, 5) and said at least one evacuation chamber (13, 13') being separated from each other by at least one membrane (100);
a porous electrical conductor (18) housed in said at least one evacuation chamber (13, 13') and traversed by said at least one second operative fluid (F2, F2'),
a first and a second electrode (A, B) separated from each other with said at least one operating chamber (4, 5) and said at least one evacuation chamber (13, 13') interposed, and suppliable with power by an electrical power supply source (12) with opposite polarities in order to generate an operative electric field in said at least one operating chamber (4, 5) and an electric field in said at least one evacuation chamber (13, 13'), with value lower than said operative electric field, due to the shielding effect of said porous electrical conductor (18);
the charged, particles contained in said operating chamber (4, 5) being susceptible of traversing said membrane (100) under the action of the operative electric field generated by said first and second electrode (A, B), of being evacuated by said at least one second operative fluid (F2, F2') in said at least one evacuation chamber (13, 13'), in which they are subjected to the action of said electric field;

wherein the apparatus further comprises a plurality of operating chambers (4, 5) and a plurality of evacuation chambers (13, 13'), distributed in succession alternated with each other, wherein said at least one operating chamber (4, 5) and said at least one evacuation chamber (13, 13') are interposed between a correspondent pair of said first and second electrodes (A, B) electrically in series;

wherein at least two intermediate electrodes (A, B) of a succession of pairs of electrodes (A, B) are substituted by at least one bipolar membrane (40).

10. Apparatus for purifying a fluid according to claim 1, wherein in said at least one operating chamber (4, 5), at least one isolating porous spacer separator (19) is housed, susceptible of being traversed by said first operative fluid (F1).

11. Apparatus for purifying a fluid according to claim 10, wherein said isolating porous spacer separator (19) is a granular material of definite thickness equal to the distance between the walls of each operating chamber.

12. Apparatus for purifying a fluid according to claim 1, wherein the porous electrical conductor (18) of said at least one evacuation chamber (13, 13') comprises at least one net made of conductive material.

13. Apparatus for purifying a fluid according to claim 1, further comprising at least one ion exchange resin (36) contained inside said at least one operating chamber (4, 5) in, order to interfere with the passage of said first operative fluid (F1), and maintained therein by means of retention means (37).

14. Apparatus for purifying a fluid according to claim 5, wherein said cover layer (38, 38') is obtained from said filtering membrane (100).

15. Apparatus for purifying a fluid according to claim 12, wherein said net made of conductive material is interposed as a spacer between said third and fourth wall (16, 16'17, 17').

16. Apparatus for purifying a fluid according to claim 4, wherein said membrane (100) is selected from the group consisting of microfiltration membranes, ultrafiltration membranes, nanofiltration membranes, reverse osmosis membranes, and ion-selective membranes.

* * * * *